US012200579B2

United States Patent
Lindsay

(10) Patent No.: US 12,200,579 B2
(45) Date of Patent: Jan. 14, 2025

(54) TECHNIQUES TO FACILITATE PERSONALIZED, TEXT MESSAGING CAMPAIGNS AT SCALE

(71) Applicant: Hustle Inc., San Francisco, CA (US)

(72) Inventor: Robert T. Lindsay, San Francisco, CA (US)

(73) Assignee: Hustle Inc., San Francisco, CA (US)

( * ) Notice: Subject to any disclaimer, the term of this patent is extended or adjusted under 35 U.S.C. 154(b) by 359 days.

(21) Appl. No.: 17/807,068

(22) Filed: Jun. 15, 2022

(65) Prior Publication Data

US 2023/0413019 A1 Dec. 21, 2023

(51) Int. Cl.
*H04W 4/00* (2018.01)
*H04W 4/12* (2009.01)
*G06F 40/186* (2020.01)
*H04N 5/76* (2006.01)

(52) U.S. Cl.
CPC ............ *H04W 4/12* (2013.01); *G06F 40/186* (2020.01); *H04N 5/76* (2013.01)

(58) Field of Classification Search
CPC ......... H04W 4/12; G06F 40/186; H04N 5/76; H04N 21/2743
See application file for complete search history.

(56) References Cited

U.S. PATENT DOCUMENTS

| | | | |
|---|---|---|---|
| 9,111,239 B2 * | 8/2015 | Minert | H04N 7/167 |
| 9,462,238 B1 * | 10/2016 | Barnes | H04N 5/77 |
| 9,699,312 B2 * | 7/2017 | Kuhn | H04M 3/5191 |
| 10,038,785 B1 * | 7/2018 | Wu | G06V 20/40 |
| 10,244,209 B1 * | 3/2019 | Barnes | H04N 9/29 |
| 10,284,723 B1 | 5/2019 | Neuer, III et al. | |
| 10,902,147 B2 * | 1/2021 | Odinak | H04M 3/42221 |
| 11,336,770 B2 * | 5/2022 | Danson | H04M 3/5175 |
| 11,509,857 B2 * | 11/2022 | Agrawal | G06T 11/00 |
| 2007/0294096 A1 * | 12/2007 | Randall | G06Q 20/322 |
| | | | 455/466 |
| 2008/0052157 A1 * | 2/2008 | Kadambi | G06Q 30/0275 |
| | | | 705/14.66 |
| 2008/0066107 A1 * | 3/2008 | Moonka | G11B 27/28 |
| | | | 725/35 |
| 2008/0249853 A1 * | 10/2008 | Dekel | G06Q 30/0277 |
| | | | 705/14.54 |
| 2009/0271256 A1 * | 10/2009 | Toebes | G06Q 30/0255 |
| | | | 705/14.54 |

(Continued)

OTHER PUBLICATIONS

"U.S. Appl. No. 17/807,070, Non Final Office Action mailed Dec. 20, 2022", 14 pgs.

(Continued)

*Primary Examiner* — Stephen M D Agosta

(74) *Attorney, Agent, or Firm* — Schwegman Lundberg & Woessner, P.A.

(57) ABSTRACT

Described herein are techniques for integrating personalized video clips, and video-based stories with a text messaging platform or service. In some instances, an administrative end-user establishes a text messaging campaign, and designates one or more agent end-users to assist in executing the campaign. The admin end-user may designate a video clip or video-based story to be communicated with a text message, and also indicate that each agent end-user is required to (or, may optionally) personalize the video clip or story.

26 Claims, 18 Drawing Sheets

(56) References Cited

U.S. PATENT DOCUMENTS

| | | | |
|---|---|---|---|
| 2011/0153362 A1* | 6/2011 | Valin | G06Q 20/1085 340/5.82 |
| 2011/0258049 A1* | 10/2011 | Ramer | G06Q 30/0273 705/14.69 |
| 2012/0004971 A1* | 1/2012 | Levi | G06Q 30/0247 705/14.5 |
| 2012/0057688 A1 | 3/2012 | Pickering | |
| 2012/0221449 A1* | 8/2012 | Kief | G06F 16/958 715/205 |
| 2013/0016115 A1 | 1/2013 | Minert et al. | |
| 2013/0198636 A1* | 8/2013 | Kief | G06F 16/958 715/730 |
| 2013/0262238 A1* | 10/2013 | Liubachev | G06Q 30/0277 705/14.66 |
| 2013/0325585 A1* | 12/2013 | Amit | G06Q 30/0241 705/14.66 |
| 2013/0325601 A1* | 12/2013 | Shekhawat | G06Q 30/0241 705/14.49 |
| 2014/0074627 A1* | 3/2014 | Kucharz | G06Q 30/02 705/14.72 |
| 2014/0229254 A1* | 8/2014 | Dammous | G06Q 30/0251 705/14.19 |
| 2014/0270105 A1* | 9/2014 | Tamblyn | H04M 3/51 379/85 |
| 2015/0121460 A1 | 4/2015 | Ristock et al. | |
| 2015/0373196 A1 | 12/2015 | Scott et al. | |
| 2016/0350675 A1 | 12/2016 | Laks et al. | |
| 2016/0358115 A1* | 12/2016 | Gustafson | G06Q 10/06395 |
| 2017/0169465 A1* | 6/2017 | Capel | G06Q 30/0277 |
| 2017/0236063 A1 | 8/2017 | Dorris et al. | |
| 2018/0005263 A1* | 1/2018 | McNulty | G06Q 30/0269 |
| 2019/0050911 A1* | 2/2019 | Fuller | G06Q 50/01 |
| 2019/0087870 A1* | 3/2019 | Gardyne | G06Q 30/0276 |
| 2023/0410153 A1* | 12/2023 | Lindsay | G06F 40/30 |

OTHER PUBLICATIONS

"U.S. Appl. No. 17/807,070, Response filed Apr. 20, 2023 to Non Final Office Action mailed Dec. 20, 2022", 23 pgs.

"U.S. Appl. No. 17/807,070, Final Office Action mailed Aug. 22, 2023", 24 pgs.

* cited by examiner

FIG. 5

| VIDEO | STORY | OPENS | PLAYS | CTAS | CREATED | |
|---|---|---|---|---|---|---|
| ☐ | INTRO STORY | 120 | 11 | 56 | MARCH 3, 2022 9:24 AM | EDIT ▸ |
| ☐ | VOLUNTEER STORY | 0 | 2 | 0 | APRIL 12, 2022 9:24 AM | EDIT ▸ |
| ☐ | CAMPAIGN STORY | 0 | 0 | 0 | MARCH 3, 2022 9:24 AM | EDIT ▸ |
| ☐ | FOLLOW UP STORY | 0 | 0 | 0 | APRIL 12, 2022 9:24 AM | EDIT ▸ |
| ☐ | VOLUNTEER STORY #2 | 0 | 0 | 0 | MARCH 3, 2022 9:24 AM | EDIT ▸ |
| ☐ | FOLLOW UP STORY #2 | 0 | 0 | 0 | APRIL 12, 2022 9:24 AM | EDIT ▸ |

FIG. 9

TECHNIQUES TO FACILITATE PERSONALIZED, TEXT MESSAGING CAMPAIGNS AT SCALE

RELATED APPLICATIONS

This patent application is related, in subject matter only, to U.S. application Ser. No. 17/807,070, with title, "Techniques to Facilitate Personalized, Text Messaging Campaigns at Scale," filed on Jun. 15, 2022.

TECHNICAL FIELD

The present application generally relates to a text messaging service or platform, which provides a scalable way to conduct personalized text messaging campaigns aimed at target audiences, using distributed workloads and optimized workflows. More specifically, embodiments of the present invention relate to techniques for integrating personalized videos and video-based stories with a text messaging service in a scalable way, without sacrificing quality control and uniformity in messaging.

BACKGROUND

People have long used email to communicate for both personal and business purposes. However, as computing devices-such as mobile phones, tablet computers, laptops, and similar devices—have become smaller, more portable, and more powerful in terms of computation and communication capabilities, people have increasingly shifted to text messaging as a preferred mode of communication in their business endeavors and personal affairs. As compared to email, text messaging is both simpler and more convenient. As text messaging has grown in popularity, a variety of text messaging applications and services have been developed to enable people and their organizations to conduct text messaging campaigns. For instance, a variety of text messaging services provide the ability to leverage a database of contacts to communicate a message, in bulk, to those contacts, where the message may, for example, relate to the marketing of a product or service. In other instances, retailers may use text messaging services to communicate information about special offers, sale events, and so forth. Educational organizations may use text messaging services to communicate information to students, staff, and other stakeholders. Restaurants and professional service providers (e.g., doctors, dentists, lawyers, and others) may use text messaging services to contact customers and clients, for example, to provide reminders about reservations, meetings and/or appointments. These are just a few examples of the many use cases for text messaging services.

One of the most common features of these text messaging services is the ability to leverage an existing database of contacts in order to communicate a message, in bulk, to all contacts, or large sets of contacts. For instance, many of these online services provide some level of integration with an enterprise's existing database of contacts. In some instances, a software-based data uploading tool may allow an enterprise to upload contact information from a local database to cloud-based storage, where the contact information can then be leveraged by the online text messaging service. In other instances, an application programming interface (API) provided by the text messaging service may allow the text messaging service to access contact information and related data stored in a local or existing cloud-based database. In either case, the text messaging service may provide a web-based user interface, via which an end-user can specify text for a text message that is then communicated, for example, as a broadcast text message, to some large number of contacts.

While this approach advantageously provides a way to quickly communicate information to a large number of people, this approach has several drawbacks. First, many recipients of such messages simply ignore these messages, believing the messages to be spam or junk. Second, this approach to broadcasting messages to large target audiences makes it impractical, if not impossible, to have personalized text-based conversations. By way of example, if one person (e.g., the message sender) generates a text message that is then broadcast to ten thousand people (e.g., message recipients), even if a small percentage of the message recipients respond with a reply to the original message, it is nearly impossible for the message sender to then follow up with a subsequent reply message in a timely manner, for each response that has been received.

BRIEF DESCRIPTION OF THE DRAWINGS

Embodiments of the present invention are illustrated by way of example and not limitation in the figures of the accompanying drawings, in which:

FIGS. 4, 5, 6, 7, and 8 illustrate examples of various user interfaces associated with an admin portal of a text messaging service, via which an admin end-user interacts to establish a text messaging campaign, consistent with some embodiments of the present invention;

FIGS. 9 and 10 illustrate examples of user interfaces of a studio application, integrated with a text messaging service, via which an admin end-user may create and manage video-based stories for use with one or more text messaging campaigns, consistent with some embodiments of the present invention;

DETAILED DESCRIPTION

Described herein is a text messaging service that facilitates personalized text-based conversations at scale, with messages that include video clips and/or video-based stories that may be personalized for the message recipient. Consistent with some embodiments, the workflows for creating the personalized content may be optimized, for example, by efficiently assigning and presenting individual contacts of a target audience (e.g., message recipients) to agent end-users in a way that reduces the overall time and effort required by each agent end-user to generate the personalized content. Furthermore, in some embodiments, the text messaging service has various automated quality control features integrated with the content creation workflows, to ensure that outbound messages, created by agent end-users, comply with quality control requirements, established by an admin end-user. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

As described herein, the inventive subject matter represents an improvement to a text messaging platform or service, such as that described in U.S. patent application Ser. No. 15/671,934, with title, "Managing Agent Relationships with a Set of Contacts via Templated Messages" (hereafter, "the '934 application"). While the inventive subject matter presented herein is an improvement to the systems and techniques described in the '934 application, those skilled in the relevant art will readily recognize that the inventive subject matter described herein may also be implemented and integrated with a wide variety of messaging services beyond those described in the aforementioned '934 application. Specifically, while the various embodiments described and illustrated herein are generally described in the context of text messaging services, which have conventionally operated over public, wireless communication networks (e.g., mobile telephone networks) using standardized protocols, such as Short Messaging Service (SMS), and/or Multimedia Messaging Service (MMS), those skilled in the art will recognize that other embodiments of the present invention could easily be implemented and integrated with any of a wide variety of other messaging services, including various instant messaging or chat services, which conventionally operate over public networks, such as the Internet.

Figure 1:
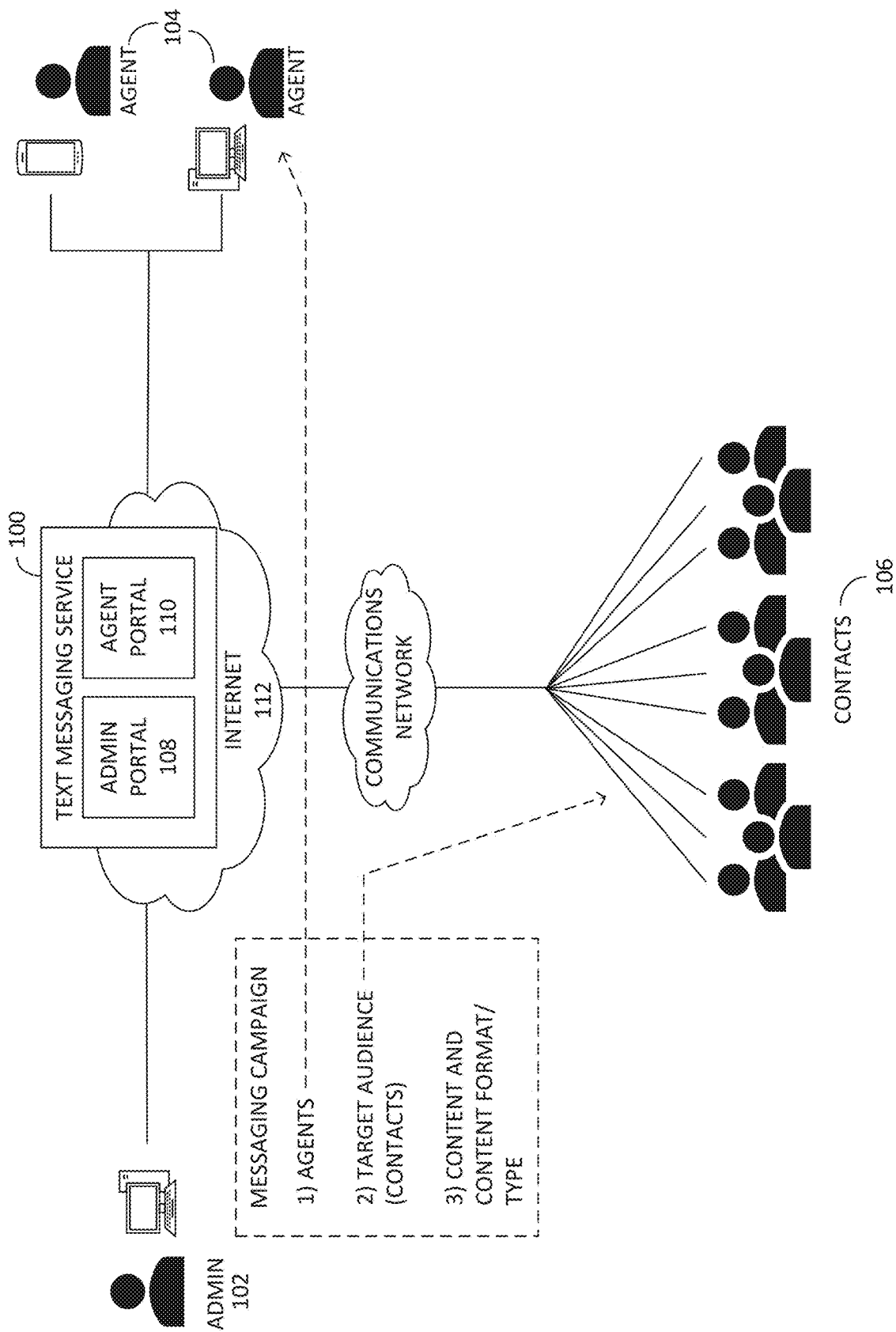
FIG. 1 is a diagram illustrating a simplified view of a network-based text messaging service, consistent with embodiments of the present invention.

FIG. 1 is a diagram illustrating a network-based text messaging service 100, consistent with some embodiments of the present invention. The text messaging service 100 may be implemented as an online or cloud-based service with a client-server architecture, with end-users accessing the service via a public computer network, such as the Internet 112. The text messaging service 100 may be provided to end-users via a software as a service (SaaS) model, such that any number of entities or organizations can subscribe to and use the service. As shown in FIG. 1, the end-users of the text messaging service 100 are designated as having one of several roles (e.g., administrator or admin end-user 102, agent end-users 104, and contacts 106.) While admin end-users 102 and agent end-users 104 will interact with the text messaging service 100 through various user interfaces that are provided by the admin portal 108, and agent portal 110, respectively, the contacts 106 are generally limited to sending and receiving messages, and otherwise accessing and viewing content that may be hosted by the text messaging service 100. As such, the admin end-user 102 and agent end-users 104 will establish accounts (e.g., with usernames/passwords) with the text messaging service 100, while individual contacts 106 will not necessarily have accounts with the text messaging service 100.

As shown in FIG. 1, the admin end-user 102 will interact with the text messaging service 100 via an admin portal 108 to establish and initiate a text messaging campaign. To establish the text messaging campaign, the admin end-user 102 will be prompted to provide and/or otherwise specify various information to include configuration settings and parameters for the text messaging campaign, via one or more form-based user interfaces. For instance, the form-based user interfaces may use text input boxes, drop-down menus, check boxes, radio boxes, buttons and similar graphical user interface (GUI) elements, to enable the admin end-user to provide relevant data to establish the text messaging campaign. Several examples of form-based user interfaces are presented and described herein, including those shown in FIGS. 4, 5, 6, 7, 8, 9 and 10, which are described in greater detail below.

While a variety of information may be provided by the admin end-user 102 when establishing the text messaging campaign, for the sake of simplicity, three specific elements of a text messaging campaign are shown in FIG. 1. First, the admin end-user 102 will specify or otherwise designate one or more agent end-users 104. The agent end-users 104 facilitate or conduct the text messaging campaign, for example, by sending messages to contacts 106, receiving messages from contacts 106, and responding to messages received from contacts 106. Second, the admin end-user 102 will designate or otherwise specify the target audience—that is, the contacts 106 or intended message recipients—for the text messaging campaign. Finally, the admin end-user 102 is responsible for generating content that will be communicated to the contacts by the agent end-users 104, as the agent end-users 104 perform various tasks assigned to workflows for the text messaging campaign.

As described in greater detail below, in many instances, the content generated by the admin end-user will be in the form of templated scripts. A templated script is a script that references one or more variables, which will be resolved by accessing a value for the variable. By way of example, a templated text message script may read, in part, as follows, "Hi <CONTACT FIRST NAME>! This is <AGENT FIRST NAME> from <COMPANY NAME> . . . ," where the bold text enclosed by the greater than and less than symbols (e.g., "< . . . >") represent variable names. The templated scripts are processed to resolve the referenced variables before the resulting script is presented to an agent end-user for communicating to a contact as a text message. As described in greater detail below, in addition to templated text message scripts, in some instances, templated video scripts are used to convey a message to be spoken by an agent end-user when the agent end-user is recording a personalized video clip to be communicated to a contact, or recording a personalized video clip that will be prepended to a video-based story.

Figure 2:
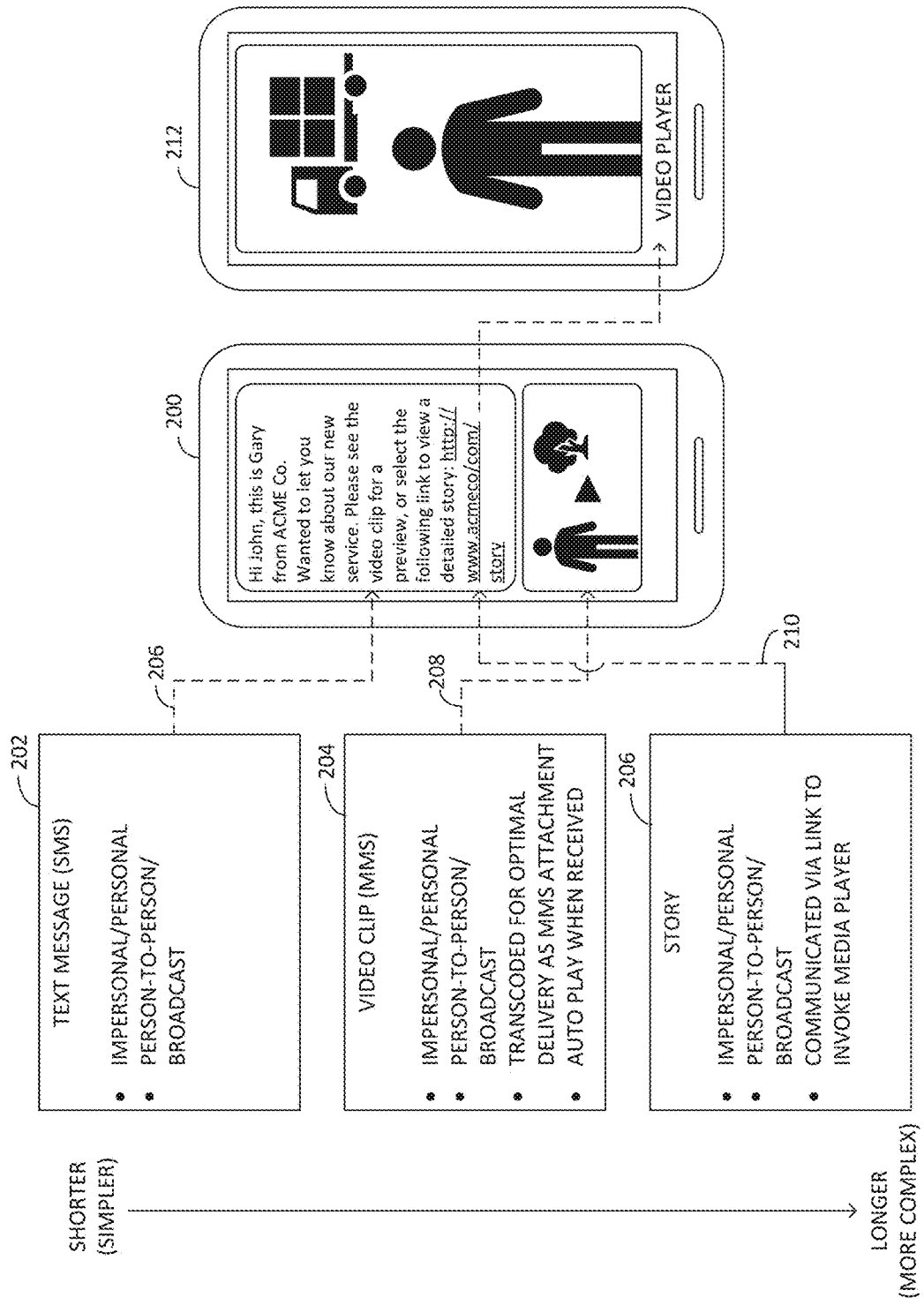
FIG. 2 is a diagram illustrating examples of the specific types of content that an administrative (admin) end-user may specify for use with a particular text messaging campaign, consistent with embodiments of the present invention.

FIG. 2 is a diagram illustrating examples of the specific types of content that an admin end-user may specify for use with a particular text messaging campaign, consistent with embodiments of the present invention. As shown, the content types include text messages 202, video clips 204, and stories 206. Each text message may be static or templated. In this context, a static text message is a text message that does not include any references to any variable names, and thus, the actual text of the message will be identical to what is specified by the admin end-user and will be the same for all agent end-users and all contacts. An admin end-user may generate a static text message, which in some cases cannot subsequently be edited or modified by an agent end-user. In contrast, a templated text message is derived from a templated script that includes one or more references to one or more variable names having values stored in one or more databases, thereby allowing the text message to be dynamically derived based on information associated with the agent end-user, information associated with the contact to whom the message is to be communicated, and information associated with the text messaging campaign, generally. Accordingly, when an agent end-user is preparing to send a text message that is based on a templated text message script, the text messaging service will first resolve all referenced variables before presenting the agent end-user with the resulting text of the text message, for communicating to the contact. Consistent with some embodiments, by default, an agent end-user is not allowed to edit a text message before sending the text message to a contact. However, in alternative embodiments, for both static and templated text messages, the admin end-user may specify a campaign setting, or a message specific setting, that determines whether an agent end-user is allowed to edit the text of a text message as specified by the admin end-user before the agent end-user sends the text message to a contact. In FIG. 2, the arrow with reference number 206 points to an example of a text message, derived from a templated text message script, as received by a contact on a mobile computing device 200.

In addition to text messages 202, another type of content involves what is referred to herein as video clips 204. With some embodiments, video clips 204 are communicated as Multimedia Message Service (MMS) message attachments, after being transcoded by the text message service. Like text messages 202, video clips may be static or templated. A static video clip is a video clip that is recorded by the admin end-user, and then associated with a text message. Accordingly, when the agent end-user sends the associated text message to a contact, the video clip created by the admin end-user will be communicated to the contact with the text message. In contrast, a templated video clip is a video clip recorded by the agent end-user who is prompted to speak or recite a message, derived from a templated video script, when the agent end-user is recording a video clip to be communicated to one or more contacts. For instance, when the agent end-user is recording the video clip to be communicated to a contact, the agent end-user will read the video script that resulted from processing the templated video script specified by the admin end-user. The video script is derived from a templated video script by resolving any variable names referenced in the templated video script. By using a templated video script, the resulting video clip can be customized and/or personalized when recorded by the agent end-user. For example, the spoken message conveyed by the agent end-user may include a greeting that includes the name of the agent and the name of the contact or message recipient, among other information. A wide variety of other variables or fields—including system defined variables or fields, as well as custom defined variables or fields—may also be used to customize and/or personalized the video script, and thus, the video clip recorded by an agent end-user. With some embodiments, video clips may be subject to certain requirements-such as a maximum length (e.g., play back duration) and/or file size. As shown in FIG. 2, the arrow with reference number 208 points to an example of a video clip, as presented on a mobile computing device 200 of a contact. In some instances, the video clip, when received at the mobile computing device 200, will automatically begin playing within a user interface of the text messaging application.

Finally, the third type of content shown in FIG. 2 is referred to herein as a story 206. A story is an arrangement of media clips (e.g., photographs, graphic images, videos and/or audio clips), which, when presented to an end-user via an appropriate video presentation application, automatically play back as a single video sequence, with each individual clip playing in order as arranged. In contrast with a video clip, which is communicated to a contact as an MMS message attachment, a story is communicated to the contact via a link in a text message. For instance, as shown in FIG. 2, the arrow with reference number 210 points to a link presented as part of the text message shown within the user interface of the text messaging application of the mobile computing device 200. When the message recipient selects the link, a video player application is invoked, and a request is communicated to the server that is hosting the story that is referenced in the link. The story is then communicated from the server to the mobile computing device 212, at which the story is presented within the video player. With some embodiments, video-based stories may be subject to different requirements than video clips. Specifically, a video-based story may have a maximum length (e.g., play back time) and file size that is greater than that for video clips.

Consistent with some embodiments of the present invention, when establishing the text messaging campaign, the admin end-user can specify that a story is to be personalized for the message recipient, by having the agent end-user record a video clip based on a video script derived from a templated video script. For instance, the admin end-user can create a templated video script for a video clip that is to be recorded by an agent end-user. Subsequent to the agent end-user recording the video clip, the video clip is communicated to the text messaging service where it is prepended to the story before being communicated to a contact. Other aspects of video-based stories are described in greater detail below in connection with descriptions of several of the various figures.

As shown in FIG. 2, each type of content (e.g., text messages, video clips, and stories) may be communicated to contacts as part of a person-to-person text messaging campaign, or as part of a broadcast text messaging campaign. A person-to-person text messaging campaign is one that involves agent end-users sending text messages to individual contacts, one text message at a time. For instance, each text message is addressed to an individual contact, and the agent end-user interacts with a user interface of the text messaging service to cause each individual message to be communicated to an intended recipient, one message at a time. In contrast, a broadcast text messaging campaign involves sending, by the agent end-user, a single broadcast message to a group of contacts. Consistent with some embodiments, a text messaging campaign may be associated with a specific goal, and as such, the selection of the goal may determine whether some or all messages associated with various workflows of the text messaging campaign are person-to-person text messages, or broadcast text messages. Although not shown in FIG. 2, other content types that may be used with the text messaging service may include still images, such as photographs, and/or graphic images, as well as animations, such as a GIF (Graphics Interchange Format) files, and so forth.

In comparison with conventional text messaging services, embodiments of the present inventive subject matter described herein advantageously distribute the workload involved in sending, receiving, and replying to text messages, to one or more agent end-users. For instance, by providing one or more admin end-users the ability to create and manage a text messaging campaign, while designating various agent end-users to help in the actual conducting of the text messaging campaign, the admin end-user can maintain control over the messaging—specifically, the content or substance of the messages being communicated—while distributing the actual workload involved in sending the messages, receiving and processing replies to the messages, and potentially following up with further reply messages. In this way, a text messaging campaign can be targeted to an extremely large audience (e.g., tens, if not hundreds, of thousands of contacts), while both maintaining some uniformity over the content, and being able to conduct the campaign and reach a large audience in a short amount of time.

Consistent with some embodiments of the invention, and as described in greater detail below, the text messaging service utilizes various optimization algorithms to increase the efficiency of conducting a text messaging campaign. For example, with some embodiments, when contacts are assigned to individual agent end-users, all contacts who are to receive the same personalized video clip may be grouped together and assigned to the same agent end-user. Accordingly, if a templated video script uses a variable name corresponding to the first name of a contact, the agent end-user is able to record a single video clip, based on one video script, which can then be sent to all contacts who, for example, share the same first name.

Consistent with some embodiments of the invention, and as described in greater detail below, the text messaging service uses quality assurance logic to ensure that any content created by an agent end-user satisfies various quality control metrics. By way of example, in some instances, the admin end-user can specify a configuration setting for a text messaging campaign, or for a specific content item (e.g., personalized video clip, or video clip for a story), such that the configuration setting indicates that a content item created by the agent end-user is to be approved by the admin end-user prior to the content item being communicated to a contact. Accordingly, after an agent end-user records a personalized video clip for a specific contact, the agent end-user may interact with the user interface, for example, by selecting a button or other GUI element that causes the video file for the video clip to be uploaded or communicated to the text messaging service. When received at the text messaging service, the video clip may be processed in accordance with any configuration settings established by the admin end-user. For example, depending upon the specific configuration settings, the video clip may be directed to a review queue, where it is held or stored until approved by an admin end-user. The admin end-user would then interact with a user interface of the admin portal to play back and review the video clip, before approving or rejecting the video clip. Only upon the approval of the video clip by the admin end-user would the video clip be added to a send queue for subsequent processing and communication to the intended message recipient. As described in greater detail below, in addition to a manual review and approval process, content items may be subjected to a variety of automated analytical processing for purposes of ensuring quality. Other aspects and advantages of the inventive subject matter described herein are set forth in connection with the description of the various figures that follow.

Figure 3:
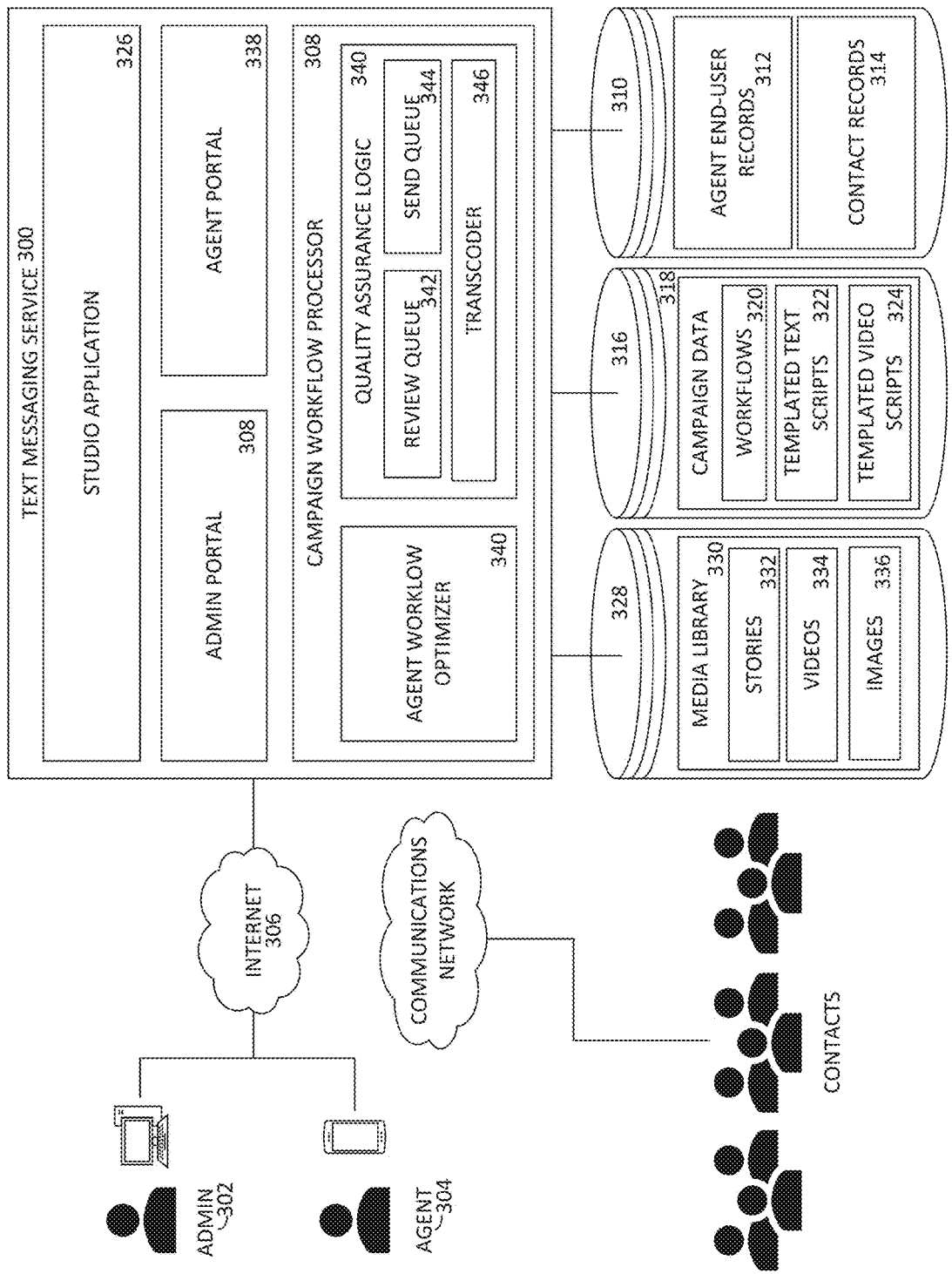
FIG. 3 is a diagram illustrating various functional components of a network-based text messaging service, consistent with embodiments of the present invention.

FIG. 3 is a diagram illustrating an example of various functional components of a network-based text messaging service 300, consistent with embodiments of the present invention. As illustrated in FIG. 3, end-users (e.g., admin end-user 302 and agent end-user 304) of the text messaging service 300 access the service over a network (e.g., the Internet 306) using client-based applications that execute on client computing devices (e.g., mobile phones, mobile computing devices, laptops, desktops, etc.). With some embodiments, the text messaging service 300 may be a web-based service, such that end-users can utilize a conventional web browser to interact with the service 300. In addition, with some embodiments, end-users may use operating specific (OS) applications executing on their client devices to interact with the text messaging service via APIs communicated over the network 306.

Consistent with some embodiments, the text messaging service 300 is role-based such that each end-user is assigned a role, and based on their respective role, the user interfaces presented to the end-user, and the interactions that the end-user will have with the text messaging service, will vary. In particular, end-users with administrative access—referred to herein as admin end-users 302—will interact with the text messaging service 300 via an admin portal 308. Via the various user interfaces presented in connection with the admin portal 308, admin end-users will provide or specify information to establish text messaging campaigns and participate in overseeing and managing active text messaging campaigns. For example, by interacting with various user interfaces of the admin portal 308, the admin end-user can specify one or more agent end-users 304 to be included in a text messaging campaign. In addition, the admin end-user may specify the target audience (e.g., contacts) to whom text messages are to be communicated, by the agent end-user(s), as part of a workflow of a text messaging campaign. As shown in FIG. 3, information about agent end-users (e.g., agent end-user records 312) and information about contacts (e.g., contact records 314) are stored in a database 310.

Consistent with some embodiments, when an admin end-user 302 is establishing a text messaging campaign, the admin end-user 302 will specify a particular goal or objective, which may be pre-defined or custom—that is, created by the admin end-user. By way of example, some predefined goals may include, but are not limited to: communicating an invitation to an event, recruiting staff and/or volunteer members, engaging with a contact, sharing a link (e.g., a hyperlink), or surveying a group of contacts. Each of the several predefined goal types may be associated with one or more workflows, with each workflow having one or more templated text scripts, for deriving text messages, and having one or more templated video scripts, for deriving video scripts for use by agent end-users when recording personalized video clips for contacts. In some instances, by simply specifying a particular type of goal for a text messaging campaign, the admin end-user 302 is also establishing or specifying for the text messaging campaign a set of workflows, and any templated text scripts and templated video scripts that are associated with the workflows. While each goal type may be associated with predefined workflows and templated scripts, the text messaging service 300 also supports fully customizable workflows and customizable templated scripts, for use with any goal, whether the goal is a predefined goal or a custom goal. As shown in FIG. 3, as an admin end-user 302 provides the requisite data to establish a text messaging campaign, the campaign data 318, including workflows 320, templated text scripts 322, and templated video scripts 324, are stored in a database 316. Consequently, after establishing and conducting a first text messaging campaign, various campaign data 318 may be re-used in a subsequent text messaging campaign.

In addition to establishing workflows 318, templated text scripts 320, and templated video scripts 322, an admin end-user may interact with a studio application 326 to create customized stories 332, video clips 334, and/or graphics and images 336, which are stored as part of a media library 330 in a database 328. The studio application 326 is a content creation application that allows an admin end-user to upload or create various media files (e.g., video clips, photograph, graphics, images, animations, audio clips, and so forth), then edit and arrange the media files to create a story. Consistent with some embodiments, a story may be communicated to a message recipient or contact, as a link in a text message. When the link is selected, a request for the story is sent to the text messaging service at which the story is hosted, and the story is then communicated to the computing device of the contact, where it can be played back via a video player application.

Consistent with some embodiments, an admin end-user can create a templated video script from which a video script can be derived. The video script can be presented to an agent end-user with instructions for preparing a personalized video clip for a contact, where the video clip will be prepended to a story before the link to the story is communicated in a text message to the contact. Other aspects and features related to stories are described in greater detail below in connection with the description of FIGS. 9 and 10.

Consistent with some embodiments, workflows that are part of a text messaging campaign may have set times during which the workflows are considered active. Accordingly, during an active workflow, agent end-users access the text message service through the agent portal 338, to perform various tasks that are defined by an active workflow. These tasks may specifically involve communicating a text message to one or more contacts, where the text message may optionally include a personalized video clip and/or a story. For example, if the workflow is part of a text messaging campaign that calls for sending a person-to-person text message, the agent end-user may be presented with a user interface that includes a first text message, derived from a templated text message script, along with a video script, derived from a templated video script. The agent end-user may be prompted to record a video clip, using the video script, to be communicated to a contact with the text message.

With some embodiments, the agent workflow optimizer 340 performs various optimization tasks to increase the efficiency of performing various tasks. For example, the agent workflow optimizer 340 allows an agent end-user to record a single personalized video clip for multiple contacts or message recipients, in some instances. For example, if a templated video script that includes one or more references to one or more variable names, results in the exact same video script for more than one contact assigned to an agent end-user, then the agent workflow optimizer will optimize the task of creating the personalized video clip. For example, if a templated video script includes a variable referencing the first name of a contact (e.g., <CONTACT FIRST NAME>), then the video script derived for a contact with the name, "John Smith," will be identical to the video script that is derived from the templated video script for a contact with the name, "John Johnson." In fact, if the templated video script includes only a reference to the contact's first name, and no other references to other variables, then the resulting video script will be the same for all contacts who share the same first name. As such, in this particular example, the agent workflow optimizer 340 will generate a user interface prompting the agent end-user to record a single video clip that will be communicated to all contacts who share the same first name. This has the effect of significantly reducing the number of personalized video clips that need to be recorded by an agent end-user—particularly when the templated video script results in the same video script for large numbers of contacts. When an agent end-user is assigned a large number of contacts, this optimization technique can save a significant amount of time.

After an agent end-user has recorded a personalized video clip, the video clip will be communicated over a network 306 to the text messaging service 300 before the video clip and an associated text message are sent to a contact. Consistent with some embodiments, when a personalized video clip is received at the text messaging service 300 and before it is communicated to a contact, the video clip is subjected to a quality assurance process, for example, by the quality assurance logic 340. As described in greater detail below in connection with the description of FIG. 15, the quality assurance process may involve various combinations of automated content analyses, and manual review. For example, with some embodiments, the admin end-user may specify various settings for a video clip, such that a campaign or message setting determines the extent to which a video clip is analyzed before being sent to a contact. For instance, the admin end-user may configure the relevant settings so that no quality check is performed, and the video clip is communicated to the contact automatically when received from the computing device of the agent end-user. However, in other instances, the admin end-user may configure the settings so that every video clip is first directed to a review queue, and only when the video clip has been reviewed and approved by the admin end-user, or another end-user designated by the admin end-user as having authority to review and approve, will the video clip be communicated to a contact. In yet other instances, one or more settings established by the admin end-user will cause a video clip to be subjected to one or more automated tools. By way of example, a video clip may be provided as input to a machine learned model to detect whether images within the video clip include objectionable content (e.g., nudity, obscene or objectionable hand gestures, and so forth). Similarly, the audio portion of the video clip may be processed to translate the spoken words to text. This resulting text may then be compared against the video script from which the spoken message was to be prepared. If the text does not correlate with the text of the video script, the video clip may be directed to a review queue for manual review and approval. Further details of the quality assurance process are described below in connection with the description of FIG. 15.

Figure 4:

FIG. 4 illustrates an example of a user interface 400 associated with an admin portal 308, via which an admin end-user may interact to provide various text messaging campaign parameters and/or configuration settings, consistent with embodiments of the invention. When an admin end-user is establishing a text messaging campaign, the admin end-user designates a group of contacts to receive text messages. In addition, the admin end-user may optionally designate one or more additional end-users to serve as agent end-users, with respect to the text messaging campaign. Additionally, and as illustrated in FIG. 4, the admin end-user defines an objective, or goal, for the text messaging campaign. As illustrated in FIG. 4, the user interface 400 includes a text input box 404 for providing a name for the goal, and a drop-down input box 402 for selecting a goal type. While the predefined goal types may vary, with some embodiments, the predefined goal types may include, but not be limited to: communicating an invitation to an event, recruiting staff and/or volunteer members, engaging with a contact, sharing a link (e.g., a hyperlink), and surveying a group of contacts. Of course, with some embodiments, it is also possible to generate a custom goal type. With some embodiments, each goal type may be associated with one or more predefined workflows, with some or all of the workflows having one or more templated scripts for deriving text messages as well as customized and/or personalized video clips.

The example user interface of FIG. 4 also shows an input box 406 at which the admin end-user can provide a description of the goal, and one or more input fields 408 for designating an event day and time. In this case, because the goal type that has been selected is an "Event Invitation" 402, the user interface 400 is prompting for an event day and time. In other instances, when alternative goal types have been selected, the user interface may prompt for a wide variety of other information related to the type of goal.

With some embodiments, by specifying an event day and time, the text messaging campaign may automatically establish a schedule for one or more workflows. In this case, a goal calendar 410 is shown in the user interface with reference 410. By way of example, the schedule may indicate the days during which certain workflows of the text messaging campaign are to be active. For instance, an initial workflow may involve communicating an initial text message to the contacts, such that the initial text message is to be sent to the contacts over some first duration of time. Then, subsequent to the initial text message being sent, a follow-up or reminder workflow may be active for a second period of time, during which follow-up text messages are to be communicated to the contacts. Accordingly, when the admin end-user is providing information for the various workflows, the admin end-user may specify specific templated text messaging scripts for various steps to be undertaken during each workflow. In addition, the admin end-user may require that personalized video clips, or a personalized story be communicated with a particular text message. In such a case, the admin end-user may generate or select a pre-existing templated video script for use in deriving a video script with a message to be recorded by the agent end-user for each contact.

Finally, as shown in FIG. 4 with reference number 412, with some embodiments, one or more parameters or preferences may be set by an admin end-user to establish a contact-to-agent assignment strategy or scheme. For instance, the admin end-user may set a preference that would allow all agent end-users to communicate text messages with all contacts of the text messaging campaign. For example, in this scenario, each agent end-user would have the ability to send text messages to any contact that is included in the text messaging campaign. However, in other instances, the admin end-user may assign contacts to specific agent end-users, such that each agent end-user is allowed to communicate text messages only with those contacts that have been assigned to the agent end-user. This assignment strategy may be favorable in circumstances where the agent end-user has a preexisting relationship or association with certain groups of contacts. For instance, consider a text messaging campaign that includes contacts in multiple geographical locations. The admin end-user may designate one or more agent end-users on a per location basis, and then assign to the agent end-users, contacts who reside in the locations of the agent end-users. Of course, other types of relationships and/or associations may be considered when assigning contacts to agent end-users.

Although not presented in FIG. 4, with some embodiments, an admin end-user may provide a trust score that is assigned to all agent end-users assigned to a particular text messaging campaign, or alternatively, the trust score may be assigned to and associated with each individual agent end-user, such that each agent has his or her own trust score. As described in greater detail below, a trust score, if assigned to an agent end-user, may be used by the quality assurance logic 340 to determine which, if any, quality assurance checks are to be performed to ensure content (e.g., text messages and/or video clips) created by the agent end-user comply with quality requirements. As shown by the text input box with reference number 414, an admin end-user may also provide to the agent end-users specific instructions on certain aspects of conducting the text messaging campaign.

Figure 5:
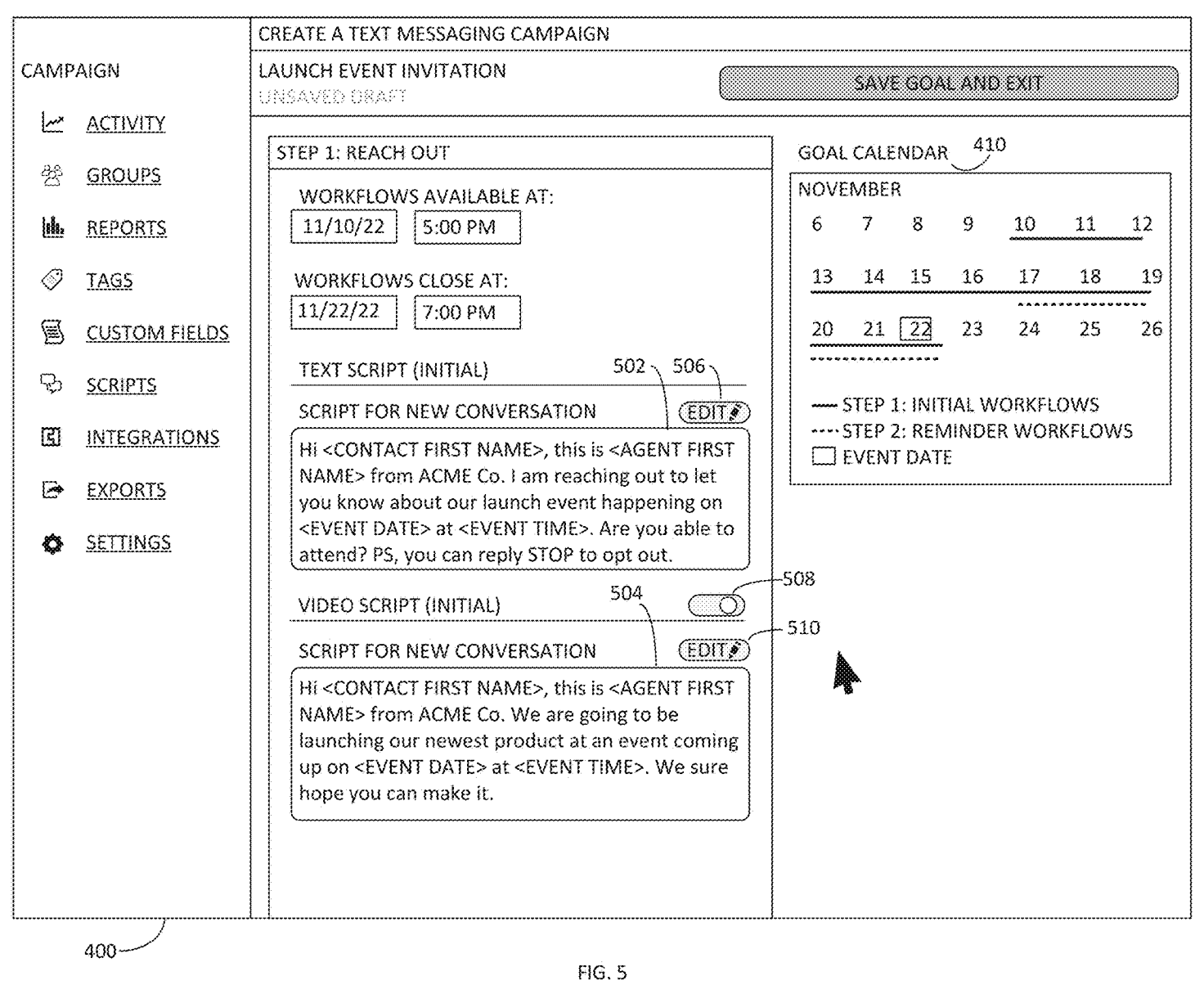

With some embodiments, when the goal type is selected, one or more workflows and templated scripts are automatically designated for use with the text messaging campaign. Accordingly, one of the next steps undertaken by the admin end-user when establishing a text messaging campaign may be to review and/or edit a templated script that is part of a workflow associated with the selected goal type. FIGS. 5. 6 and 7 illustrate various user interfaces that allow the admin end-user to create new templated scripts and/or edit existing templated scripts. These templated scripts may be templated text message scripts, for deriving text messages, or templated video scripts, for deriving video scripts for use by an agent end-user when recording a video clip to be communicated to a contact.

FIG. 5 is a user interface diagram illustrating an example of a user interface 400 that may be used by an admin end-user in specifying or editing a templated text message script 502, from which a text message may be generated, and/or a templated video script 504, for use in recording a personalized video clip, consistent with embodiments of the invention. As shown in the example user interface 400, a text box 402 includes the text of a templated text message script that is part of a workflow associated with the text messaging campaign. Specifically, in this instance, the templated text messaging script 502 is associated with a task ("STEP 1: REACH OUT") of an initial workflow for the text messaging campaign. Similarly, a text box 504 includes the text of a templated video script—also associated with task of the initial workflow.

Figure 6:
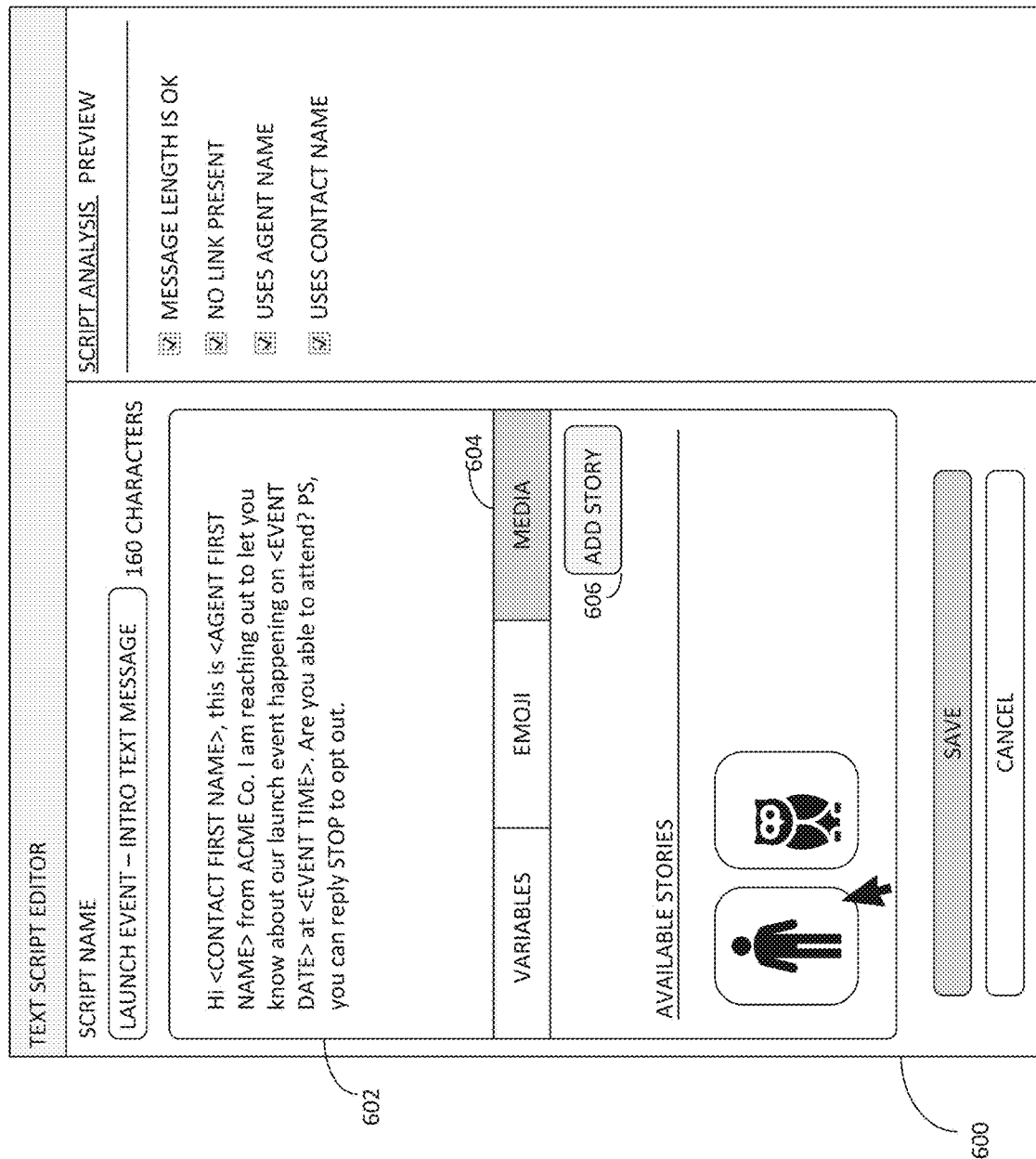

If the admin end-user prefers to edit the text of the templated text message script shown in the text box 502, the admin end-user may select the "EDIT" button 506, and in response, the admin portal 308 will cause a user interface 600 to be presented, such as that shown in FIG. 6. With some embodiments, the user interface 600 may be a pop-up window that appears displayed over the top of the underlying user interface 400.

As shown in FIG. 6, the user interface 600 provides a text input box 602 in which the text of the templated text message script may be edited. In addition, various GUI elements are presented, such as the button labeled, "VARIABLES," which provides the admin end-user with the ability to add variables to the templated text message script. A button labeled, "EMOJI," when selected, will cause the user interface to present various emojis and/or symbols that may be added to the text of the templated text message script. In addition, the "MEDIA" button with reference number 604, when selected, causes the user interface to present any video-based stories that may be available for the text messaging campaign. Accordingly, if the admin end-user would like to add a video-based story to a text message derived from the templated text message script shown in the text input box 602, the admin end-user would simply select a thumbnail for an available story and a hyperlink associated with the story would be added to the text of the templated text message script shown in the text input box 602.

Referring again to FIG. 5, if the admin end-user prefers there to be a personalized video clip presented with the initial text message, derived from the templated text message script 502, the admin end-user may select the toggle switch with reference number 508 to activate or invoke the availability of the templated video script 504. Here again, if the admin end-user would like to edit the templated video script 504, the admin end-user might select the "EDIT" button with reference number 510. In this case, selecting the "EDIT" button 510 will cause the admin portal 308 to present a user interface such as that illustrated in FIG. 7 with reference number 700. Whereas the user interface 600 allows the admin end-user to edit a templated text message script, the user interface 700 shown in FIG. 7 provides the admin end-user with a means for editing a templated video script that is used to derive a video script for use by an agent end-user when recording a personalized video clip for a contact.

Figure 7:
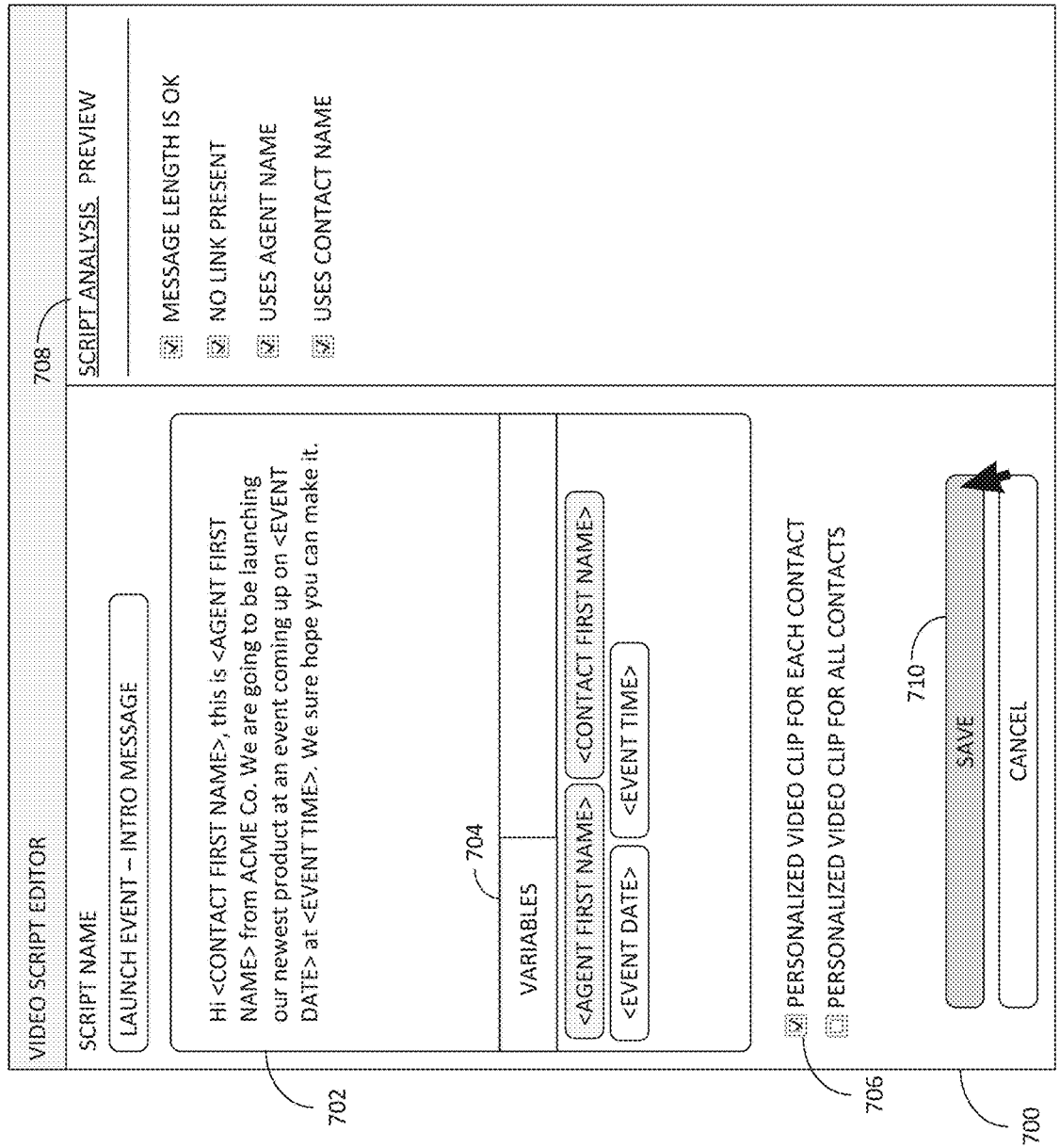

As shown in FIG. 7, the user interface 700 includes a text input box 702 showing the text of the templated video script, where it may be edited by the admin end-user. Selecting the "VARIABLES" button 704 will bring up or show a list of available variable names that may be added to, or removed from, the templated video script shown in the text input box 702. As indicated by reference number 706, with some embodiments, the admin end-user may specify that the video clip to be recorded by the agent end-user based on the templated video script 702 is to be personalized for each contact—for example, by using the name of the contact in the spoken message recorded with the video clip. Alternatively, the admin end-user may specify that the recorded message be personalized for the entire set of contacts—for example, by speaking only the name of the agent end-user.

As shown with reference number 708, with some embodiments, the text messaging service performs a script analysis by analyzing the text of the templated script, including any variable references included within the text 702, to assess whether various rules are satisfied. The rules themselves may be configured via a separate user interface (not shown) of the text messaging service. As an example, a rule may specify a minimum or maximum length of the message (e.g., measured in word count). Additionally, a rule may be processed to confirm that the variable names included in the templated video script 702 are consistent with other settings for the script. Thus, if the admin end-user has selected the check box with reference number 706, the script analysis may check to ensure that the templated video script includes a reference to the variable name for the contact, and/or the agent, and so forth. After the admin end-user has finalized the templated video script 702, the admin end-user can select the "SAVE" button 710 to return to the user interface with reference number 400.

Figure 8:
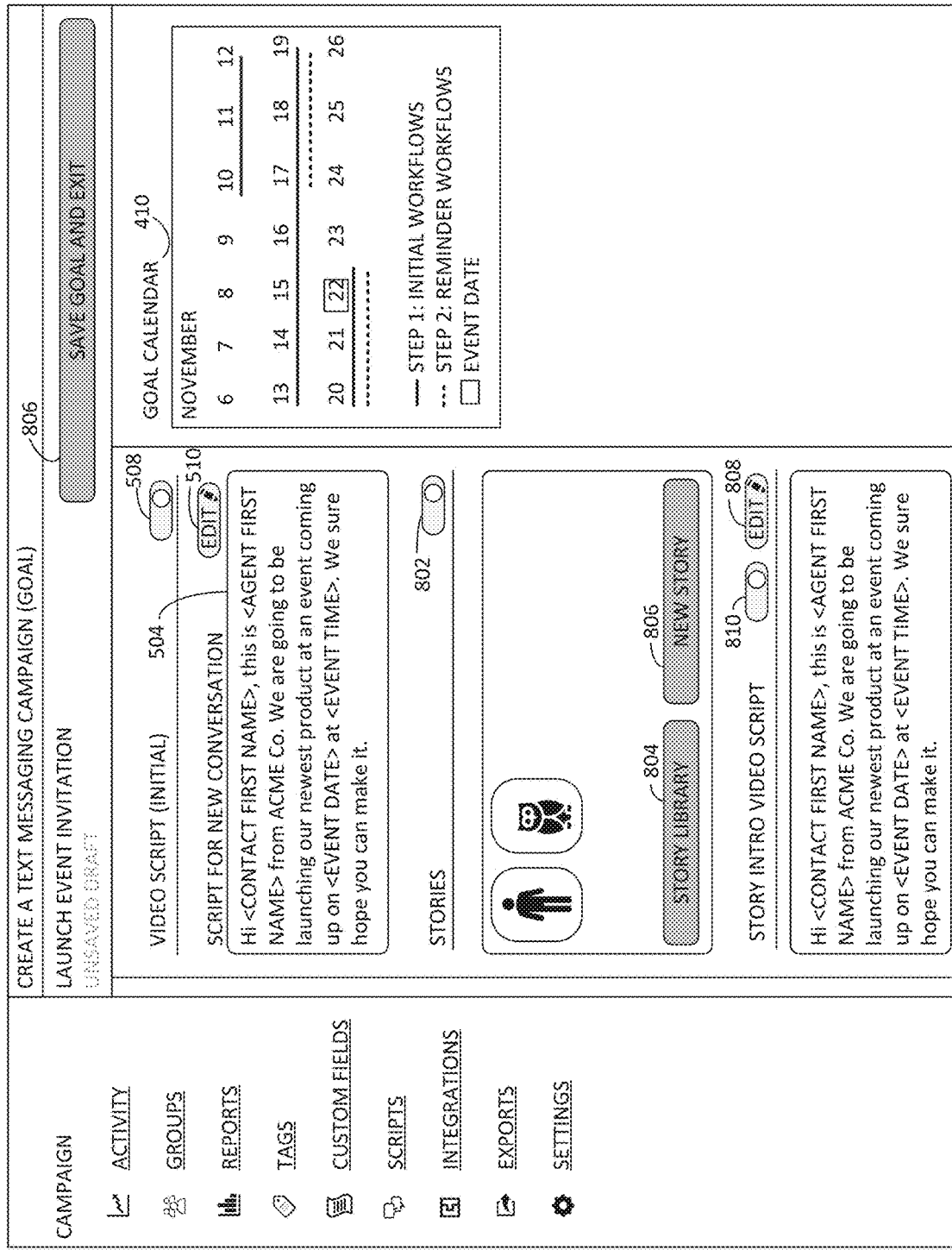

Referring now to FIG. 8, consistent with some embodiments, an admin end-user may optionally specify for a particular step of a workflow of a text messaging campaign that a text message is to include a story. Specifically, when an admin end-user elects to include a story with a text message, a link (e.g., a hyperlink) is created and added to the text of the text message, where the link references the story. Accordingly, as shown in FIG. 8, by selecting the toggle button 802, the admin end-user can activate or invoke the story feature. With the toggle button 802 invoked, the user interface 400 will present an icon or thumbnail image representing each video-based story that is currently available to be associated with a text message for the particular text messaging campaign.

The button with label, "STORY LIBRARY" 804, when selected by the admin end-user, will cause the admin portal 308 to present a user interface 900 (FIG. 9) of the studio application 326, and specifically, a user interface for a story library—a collection of existing stories—that the admin end-user can associate with a text messaging campaign. Referring now to FIG. 9, an example of a user interface 900 for a story library is presented, consistent with some embodiments of the present invention. Consistent with some embodiments, when a story is created, the story is automatically saved in a story library. Accordingly, after a story is used in a first text messaging campaign, the story can easily be selected for use in a subsequent text messaging campaign. As shown in the example user interface 900, each row 902 represents a story available for selection by the admin end-user. The columns with labels, "OPENS" 904, "PLAYS" 906, and "CTAs" 908, show performance metrics for the stories, resulting from a current or previously conducted text messaging campaign. For example, the story with the name, "INTRO STORY" was selected for opening by one-hundred twenty ("120") contacts. In this case, the act of opening a story means that the contact selected the link to the story as presented in the text message received by the contact. Similarly, the count of "PLAYS" indicates the number of contacts who viewed the entire story, or some substantial portion of the story, as the story was played in a video player application. Finally, the count of "CTAs" represents the number of contacts who, upon being presented a button or link (e.g., an overlay on the video-based story) associated with a call-to-action specified by the admin end-user, selected the button or link. By presenting the performance metrics with each story, the admin end-user can quickly and easily see which stories have been the most effective, historically.

As shown with reference number 910, the admin end-user may select the "EDIT" button 910 to edit the story and its associated parameters and preferences, prior to selecting the story for association with a templated text message script. Similarly, if none of the stories in the story library are suitable for use in the text messaging campaign that is being established by the admin end-user, the admin end-user can select the button 912 with label, "NEW STORY" to create a new story.

Referring again to FIG. 8, if the admin end-user prefers to generate a new video-based story for use with a specific templated text message of a text messaging campaign, the admin end-user can select the "NEW STORY" button with reference number 806. Similarly, if after reviewing the stories in the story library (e.g., the user interface 900 shown in FIG. 9), the admin end-user might select the button with label "NEW STORY" with reference number 912 (FIG. 9). In either case, when the admin end-user selects to create a new story, a user interface 1000 similar to that shown in FIG. 10 will be presented.

Figure 10:
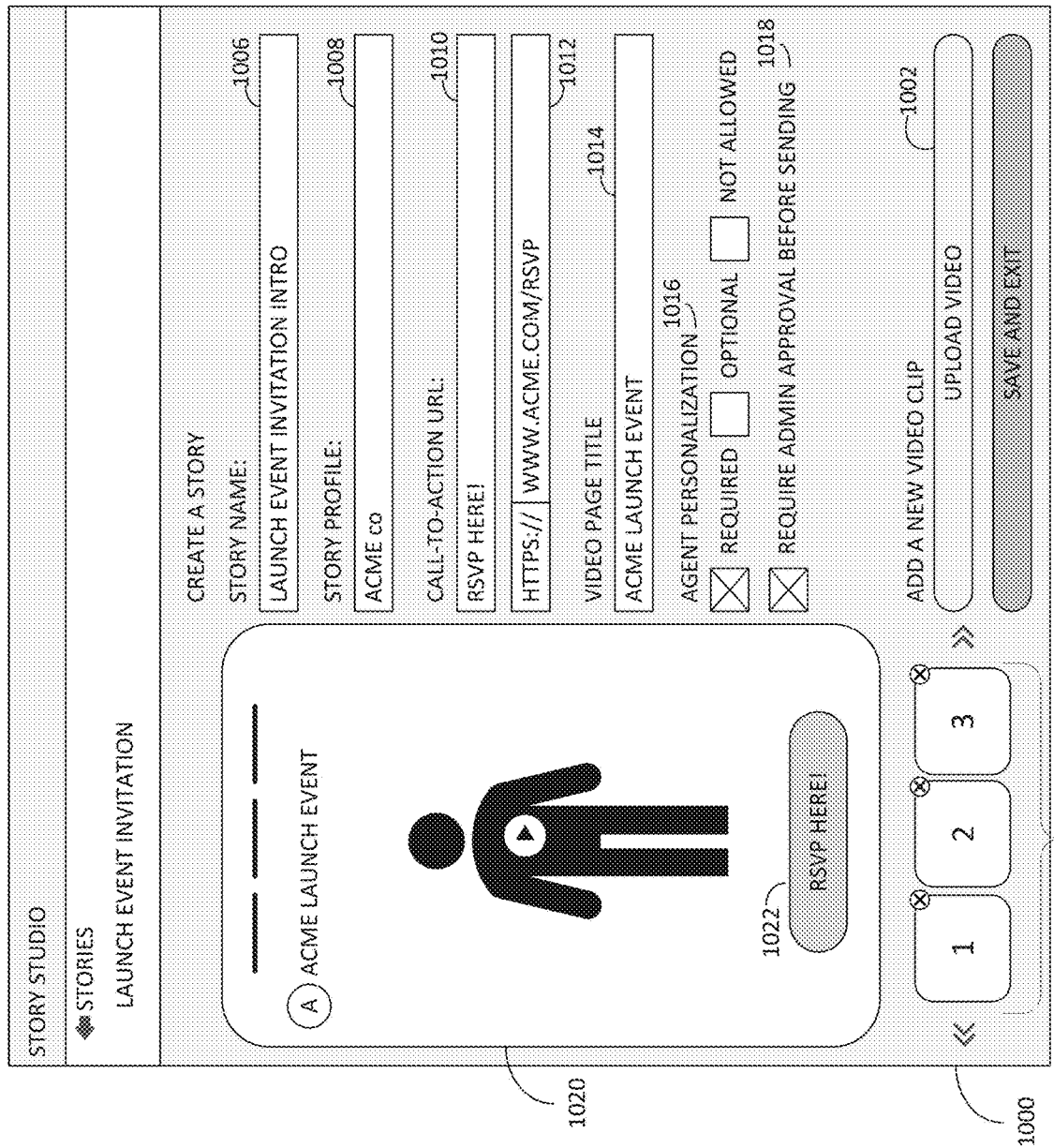

FIG. 10 is a user interface diagram illustrating an example of a user interface 1000 of a text messaging service via which an admin end-user may create a new video-based story for use with a text messaging campaign. An admin end-user creates a story by uploading one or more video clips, which may then be arranged for playback in the order in which they are uploaded. Accordingly, as shown in the user interface of FIG. 10, a button labeled, "UPLOAD VIDEO" 1002, when selected, provides a user interface (not shown) via which an admin end-user can select one or more video files (e.g., video clips) for uploading from the client computing device of the admin end-user to the text messaging service. As shown in the example user interface 1000, the admin end-user has already uploaded three video clips 1004, numbered as "1", "2", and "3". Although not shown in the example user interface 1000, with some embodiments, a thumbnail image selected from a particular frame of each video clip may be presented in the user interface, along with the numbering of the video clip, so that the admin end-user can easily view, understand, and confirm the order in which the separate video clips will be played back when presented as a story.

As shown in the example user interface 1000, a text input box 1006 prompts the admin end-user to enter or provide a name for the story, and a second input box 1008 prompts the admin end-user to provide or select a profile with which the story will be associated. For example, with some embodiments, an admin end-user may conduct text messaging campaigns for more than one group (e.g., different departments within a single enterprise), or, for more than one enterprise (e.g., different companies, or organizations). Accordingly, the text messaging service provides support for this by providing an end-user with the ability to create different accounts or profiles.

When creating the story, the admin end-user is prompted to provide parameters and preferences for a call-to-action. Here, a call-to-action is some action that a contact is being persuaded to take, as part of the text messaging campaign. Generally, the call-to-action will be related to the objective or goal of the text messaging campaign, as set by the admin end-user. By way of example, if the goal of the text messaging campaign involves persuading contacts to attend an event, the call-to-action as included with the story may be a link to a website or webpage via which a contact can register to attend the event. Accordingly, as shown in the example user interface 1000, the admin end-user is prompted to provide both a label 1010 (e.g., "RSVP HERE!") and a corresponding link, or uniform resource locator (URL) 1012. As shown in the story preview portion 1020 of the example user interface 1000, a button 1022, derived from the input provided by the admin end-user to the call-to-action parameters (e.g., input boxes 1010 and 1012) is shown in the preview 1020 as being overlayed on the video portion of the story. Finally, the preview shows a video page title 1024, derived from input 1014 provided by the admin end-user as prompted by the input box 1014 for designating a video page title.

Consistent with some embodiments, the story parameters and preferences may include one or more settings relating to agent personalization for the story. For instance, as shown with reference number 1016, the example user interface 1000 allows the admin end-user to designate an agent personalization setting that will determine if an agent end-user is 1) required to personalize the story by adding a video clip to be prepended to the story, 2) may optionally personalize the story, or 3) is not allowed to personalize the story. When the admin end-user selects an option requiring or allowing each agent end-user to personalize the story, the admin end-user may also specify a quality control requirement for any video clip generated by an agent end-user and uploaded to the text messaging service. For instance, in the example user interface 1000, the check box associated with the label, "REQUIRE ADMIN APPROVAL BEFORE SENDING" 1018 indicates that video clips generated by the agent end-users are to be approved by an admin end-user prior to those video clips being communicated to a contact as part of the text messaging campaign. Although not shown in FIG. 10, additional quality control parameters or preferences may be presented to the admin end-user, allowing the admin end-user to specify one of several different video clip approval routines or quality assurance checks to be performed on any video clip provided by an agent end-user. The admin approval and quality assurance checks are described in greater detail below in connection with FIG. 15.

When an admin end-user specifies that an agent end-user is required to, or may optionally (e.g., at the discretion of the agent end-user), personalize a story by uploading a video clip to be prepended to the story, the admin end-user may provide a templated video script from which the agent end-user is to generate the personalized video clip.

Figure 11:
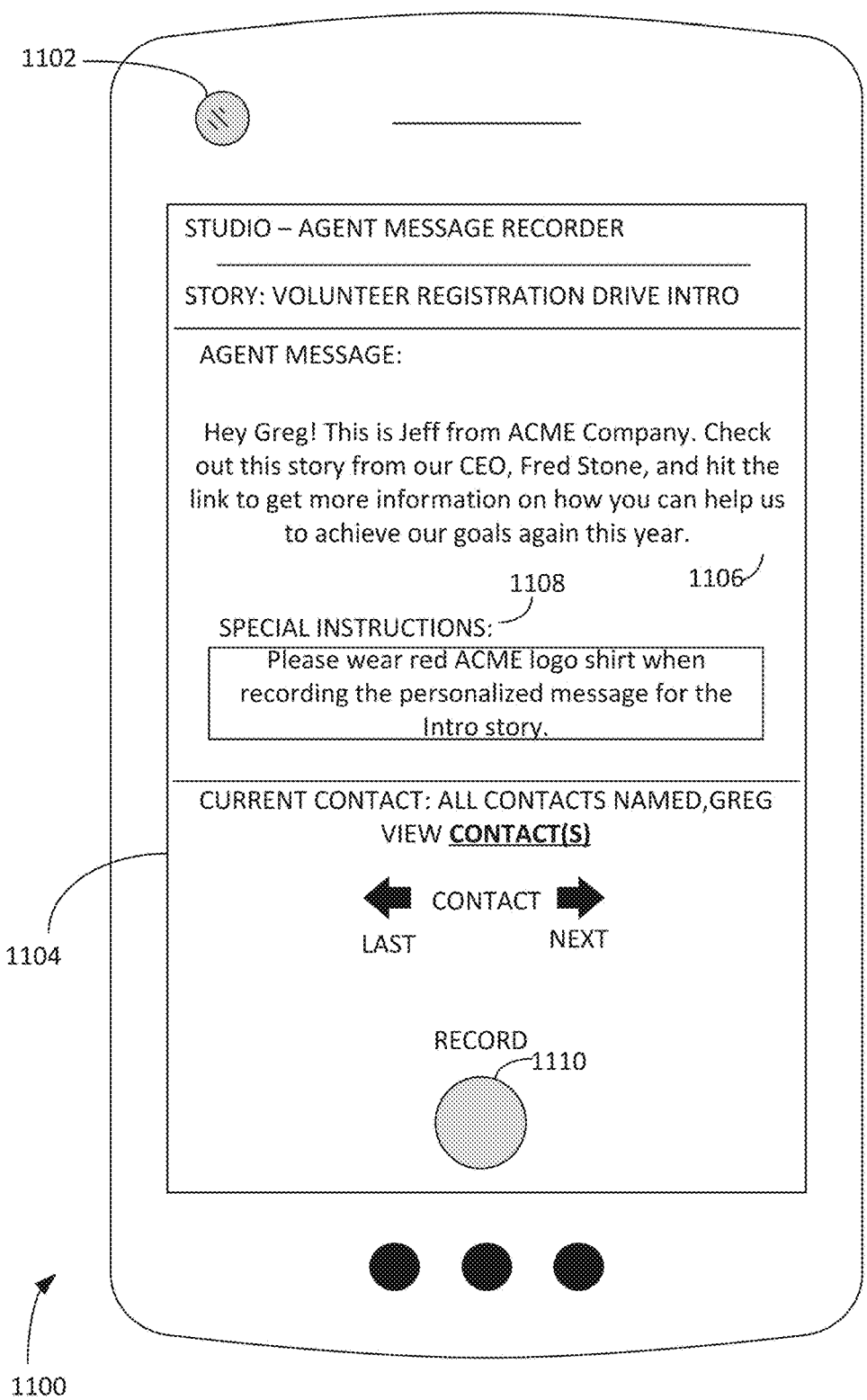
FIG. 11 illustrates an example of a user interface associated with an agent portal of a text messaging service, via which an agent end-user interacts to record a personalized video clip for a message recipient (e.g., a contact), where the user interface displays a video script that is based on a templated video script, consistent with some embodiments of the present invention.

FIG. 11 is a diagram of a mobile computing device 1100 (e.g., a mobile phone) having an image sensor 1102 for capturing both still images (e.g., photographs) and videos, and an audio sensor (e.g., microphone) for capturing audio. The display of the mobile phone is presenting a user interface 1104 of an application associated with a text messaging service, where the user interface 1104 is presenting to an agent end-user a video script 1106 based on a templated video script, that was previously generated by an admin end-user, consistent with some embodiments of the invention. Although the example illustrated in FIG. 11 involves a mobile phone 1100 as a client computing device, in other embodiments a similar user interface may be presented via a web-browser on a desktop, laptop, tablet computing device, or any other suitable computing device. As shown in FIG. 11, the video script 1106 being presented to the agent end-user has been derived from a templated video script specified by an admin end-user. In addition to the video script 1106, the user interface 1104 includes special instructions for the agent end-user, as previously specified by the admin end-user. In this example, the agent end-user is being prompted to generate a video clip with a spoken message addressed to all contacts who share the first name, Greg. The various GUI elements of the user interface allow the agent end-user to quickly move forward or backward in a list of contacts to whom messages need to be recorded. The user interface 1104 includes a record button 1108, which, when pressed, activates the video recording functionality of the image sensor 1102. Although not shown in the example user interface, once a video clip has been recorded, a preview pane or interface may be presented via which the agent end-user can preview the video clip and associated text message, and/or submit the video clip for approval or for prepending to a story. Those skilled in the art will readily recognize that a similar user interface may provide similar functionality for recording a personalized video clip, which might be communicated as an MMS attachment, as opposed to a link, as is the case with stories.

Consistent with some embodiments, the mobile application that allows an agent end-user to record a video clip may utilize one or more automated processes to ensure the quality of the video clip is sufficient. By way of example, the application may detect when the lighting level is low, and in response, prompt the agent end-user to relocate or modify his environment to improve the lighting, and thus, the quality of recorded video. Similarly, the audio may be analyzed, and when the audio level is too low, or there is too much noise, the agent end-user may be prompted to make changes to improve the audio recording for the video clip. With some embodiments, the text messaging service may also utilize various automated processes to ensure that a video clip satisfies one or more quality requirements.

Figure 12:
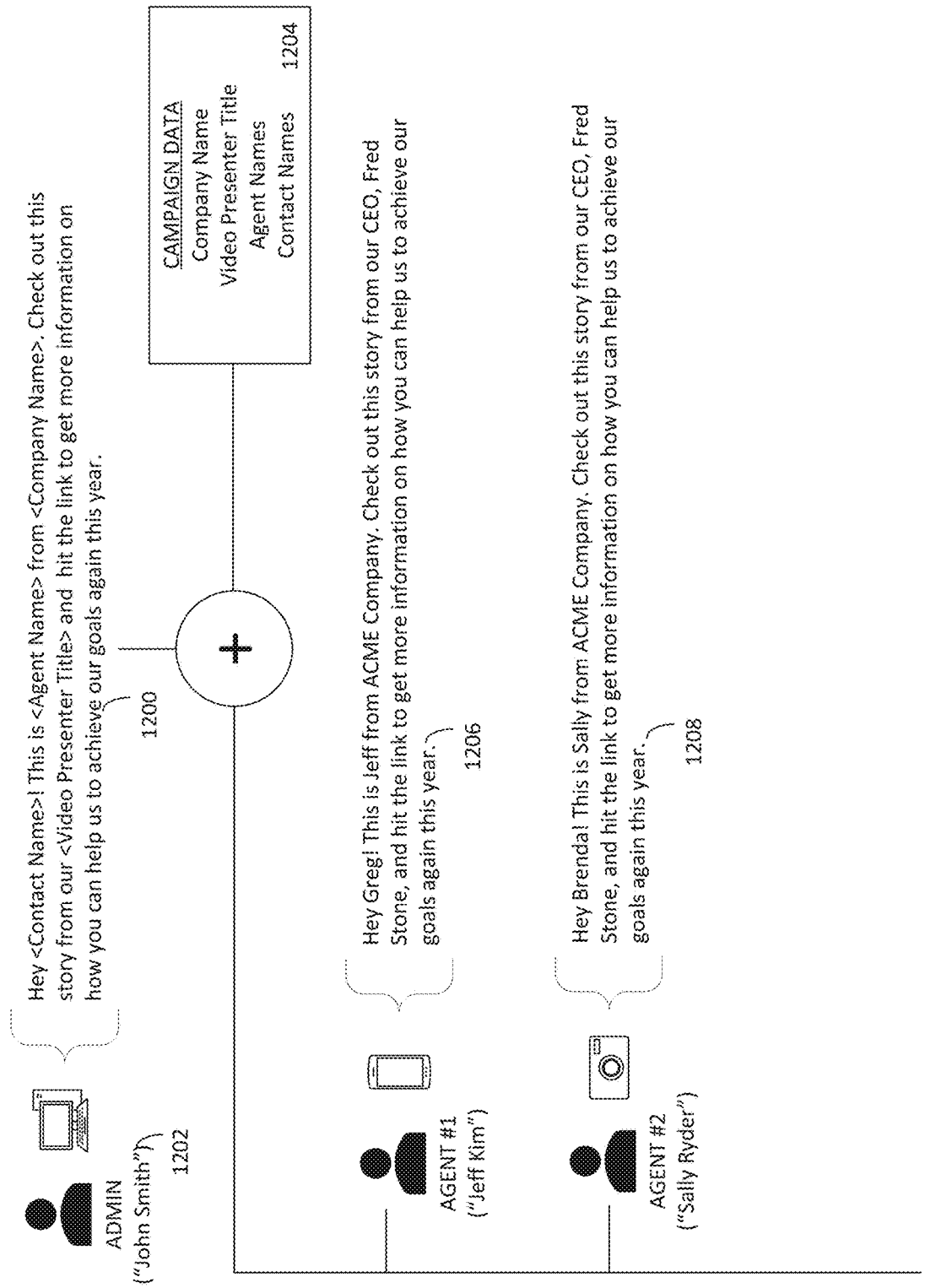
FIG. 12 illustrates an example of how an agent workflow optimizer of a text messaging service derives video scripts from a templated video script, for use by one or more agent end-users in performing the task of recording personalized video clips to be communicated to message recipients, consistent with some embodiments of the invention.

FIG. 12 is a diagram illustrating an example of how an agent workflow optimizer 340 of a text messaging service derives video scripts (e.g., scripts 1206 and 1208) from a templated video script 1200, for use by one or more agent end-users in performing the task of recording personalized video clips to be communicated to message recipients or contacts, consistent with some embodiments of the invention. After a templated video script 1200 has been created or selected by an admin end-user—specifically, a templated video script from which an agent end-user is to prepare a personalized video recording; a video script derived from the templated video script is presented to an agent end-user. For instance, either before, or during, the active state of a particular workflow of a text messaging campaign, each agent end-user designated to participate in the text messaging campaign will be prompted to prepare a personalized video clip. In some instances, the personalized video clip may be communicated from the text messaging service to a device of a contact as an MMS attachment, whereas in other instances, the personalized video clip may be prepended to a video-based story. When an associated text message is sent to a contact, a link to the story is communicated within the message.

As illustrated in FIG. 12, a templated video script 1200 specified by the admin end-user 1202 is processed to resolve variable references included within the templated script 1200 with the appropriate data 1204 from the text messaging campaign. The data that may be referenced by a variable in a templated script may be associated with a particular contact record for a contact assigned to the text messaging campaign. Alternatively, the data may be associated with an agent record, data relating to or associated with the text messaging campaign, or even a custom data field created by the admin end-user. As shown in FIG. 12, the video scripts (e.g., scripts 1206 and 1208) displayed to each of the agent end-users (e.g., Jeff Kim, and Sally Ryder) have been presented to include the appropriate values of the referenced variables. As such, each agent end-user can read, or repeat verbatim, the resulting video script when recording a personalized video clip for a particular contact, or for prepending to an existing video-based story.

Figure 13:
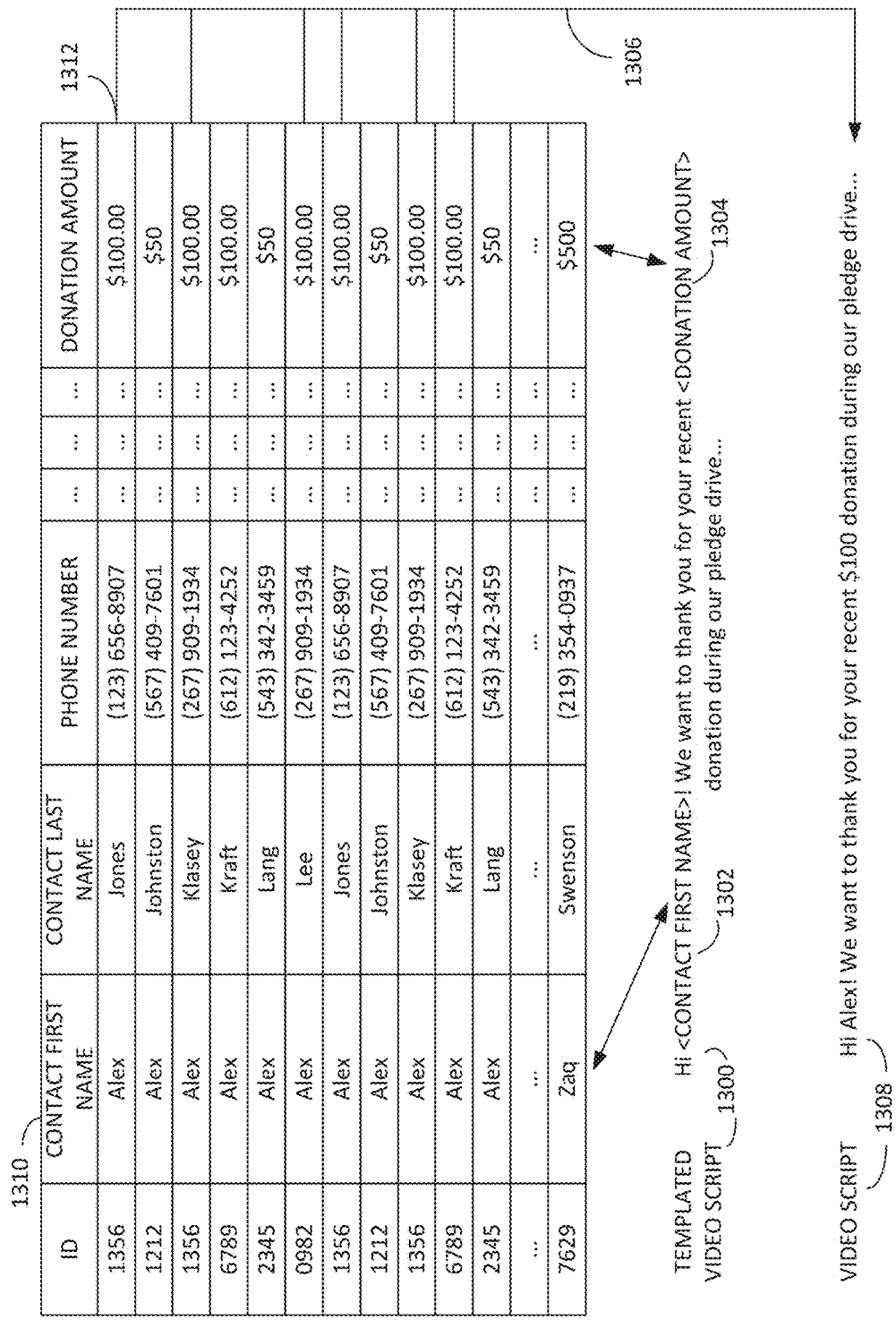
FIG. 13 illustrates an example of how an agent workflow optimizer optimizes a video recording task for an agent end-user, consistent with some embodiments of the present invention.

FIG. 13 is a diagram illustrating an example of how an agent workflow optimizer 340 optimizes a video recording task for an agent end-user, consistent with some embodiments of the present invention. Consistent with some embodiments, an agent workflow optimizer 340 will optimize the task of recording a personalized video clip for a contact, by only prompting an agent end-user to create a single video clip for any templated video script that results in the exact same video script. By way of example, as shown in FIG. 3, there is a templated video script with reference number 1300. The templated video script 1300 has two references to variables—for example, a first reference to a variable, "CONTACT FIRST NAME" 1302 and a second reference to a second variable, "DONATION AMOUNT" 1304. As shown by the arrow with reference number 1306, six different records in the table 1310 result in the exact same video script 1308. For example, when the templated video script 1300 is applied to the very first record (row) 1312 in the table, the result is the video script with reference 1308. For example, for that particular record 1312, the first name of the contact is "ALEX" and the donation amount is "$100." As shown in FIG. 13 in the table 1310, at least five other records (rows) result in the exact same video script 1308, as the relevant data for those records is the same as it is for the first record 1312. Consequently, the agent end-user optimizer will prompt the agent end-user to create or record just one personalized video clip, which can then be used with all contacts who share the same information referenced by variable name in the templated video script. Depending upon the number or records sharing in common the same data referenced by a templated video script, this optimization process can significantly reduce the total number of video clips that an agent end-user might have to record for a large target audience.

Figure 14:
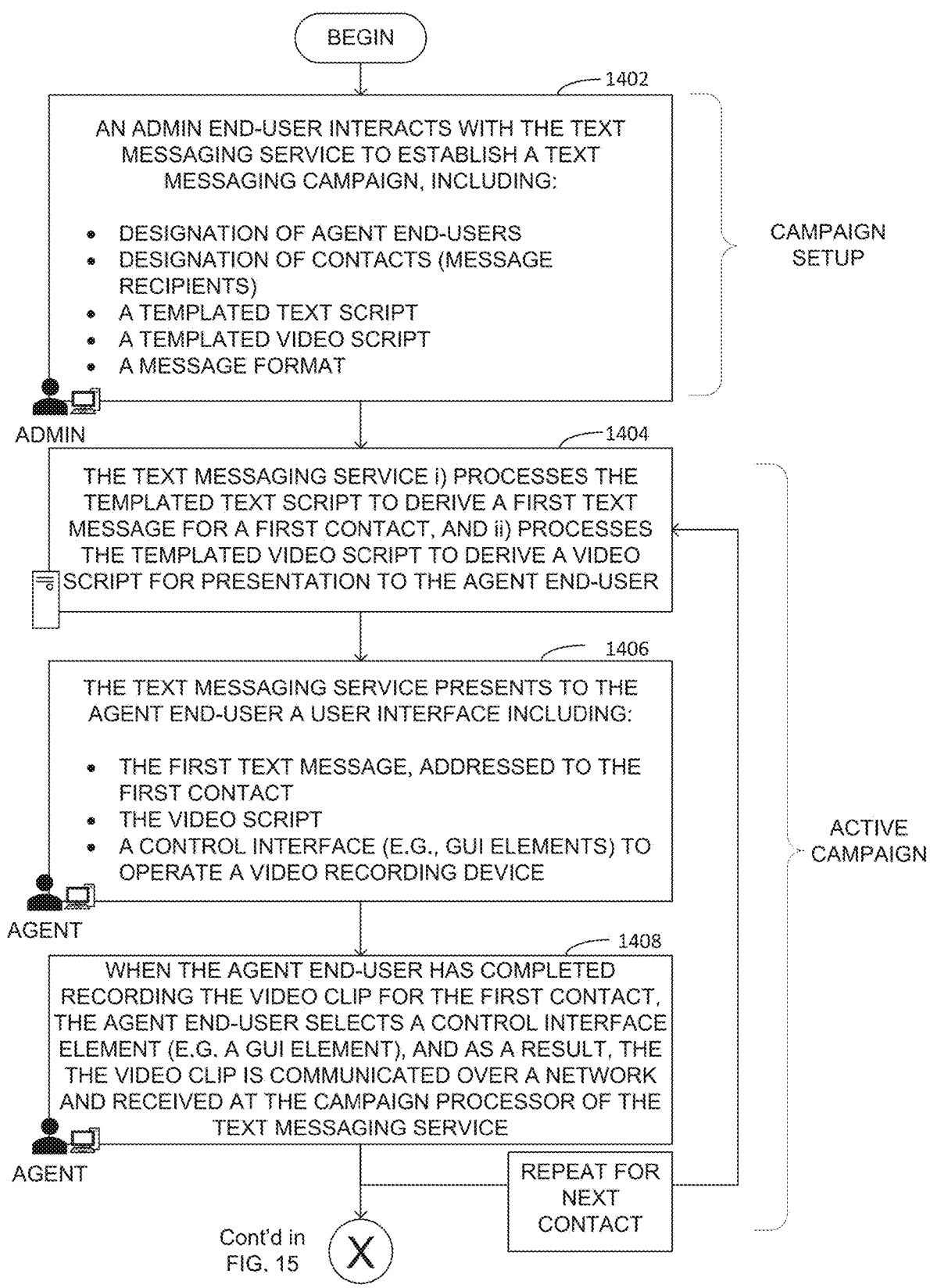
FIGS. 14 and 15 illustrate a flow diagram showing various processing steps by a text messaging service when communicating personalized video clips and/or personalized video-based stories to one or more contacts in connection with a text messaging campaign, consistent with embodiments of the present invention.
Figure 15:
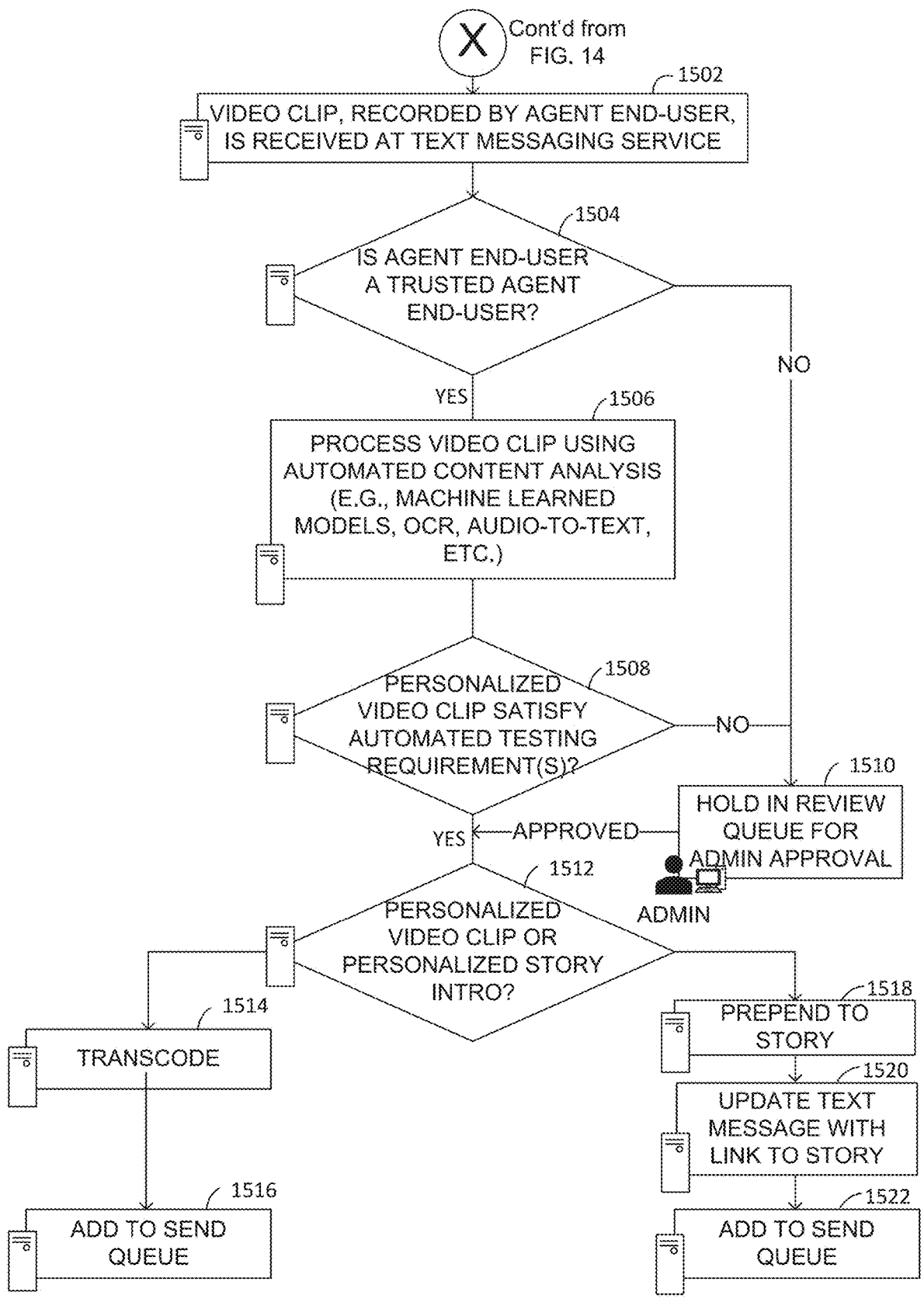

Consistent with some embodiments, when an admin end-user has designated several agent end-users to facilitate a text messaging campaign, the agent end-user optimizer 340 may intelligently assign contacts to the individual agent end-users, for example, by grouping contacts by shared video scripts. For instance, when a video script based on a templated video script is the same for some group of contacts, then those contacts may be grouped together for purposes of assignment to an agent end-user. This reduces the overall number of personalized video clips that need to be recorded by any individual agent end-users, as well as the group of agent end-users. By way of example, if a templated video script uses a variable for the first name of a contact, it will be more efficient to assign all contacts with the same first name to the same agent end-user, so that agent end-user can record a single personalized video script for those contacts. With some embodiments, a separate data field for storing a representation of a phonetic pronunciation of a contact's name may be created. Accordingly, those contacts whose name is pronounced the same way, regardless of the spelling of the name, may be grouped together for purposes of prompting an agent end-user to record a personalized video clip FIGS. 14 and 15 illustrate a flow diagram showing a procedure or method performed by a text messaging service to generate personalized video clips and/or personalized video-based stories for a text messaging campaign, consistent with embodiments of the present invention. As illustrated in FIG. 14 by reference 1402, a text messaging service presents to an admin end-user a user interface via which the admin end-user provides and/or selects information to establish various settings and parameters for a text messaging campaign. Specifically, via the user interface, the admin end-user may designate one or more end-users to be agent end-users for a particular text messaging campaign. In this context, agent end-users are end-users who are authorized by an admin end-user to send and receive text messages and related content items (e.g., personalized video clips and personalized video-based stories) to contacts or message recipients.

In addition to designating agent end-users, the admin end-user may designate a set of contacts as a target audience for the text messaging campaign. Via the user interface presented to the admin end-user, the admin end-user will select or otherwise provide a templated text script from which a text message will be derived. Also via the user interface, the admin end-user may optionally select or otherwise specify a templated video script from which a video script is to be derived. The video script may be presented to one or more agent end-users when prompting the agent end-user to record a personalized video clip for a contact. Finally, at the method operation with reference number 1402, the admin end-user may specify a message format—specifically for the personalized video clip to be recorded. For instance, in some cases, the admin end-user may indicate via the user interface that a personalized video clip recorded by an agent end-user is to be communicated to a contact as an MMS attachment, such that the video clip will automatically play back on the messaging application of the message recipient. Alternatively, the admin end-user may specify that the personalized video clip recorded by the agent end-user is to be prepended to an existing video-based story, such that a link to the video-based story is communicated to the contact in a text-based message.

At method operation 1404, after the admin end-user has established the text messaging campaign, the text messaging service will process the templated text message script to derive a text message for a first contact. The text messaging service will also process the templated video script to derive or generate a video script for a first contact. In both cases, processing the templated scripts involves resolving any variable names that are referenced within a respective script, so that the resulting script includes a value for each referenced variable.

At method operation 1406, the text messaging service presents to an agent end-user a user interface that includes the text message addressed to the first contact. In addition, the user interface presented to the agent end-user includes the video script and a control interface to operate a video recording device integral with the agent end-user's computing device. The user interface prompts the agent end-user to record a video clip with a spoken message that is based on the video script presented in the user interface.

Finally, at method operation 1408, the recorded video clip is communicated to the text messaging service when the agent end-user selects a button or other similar GUI element presented on the user interface. The method operations 1404, 1406 and 1408 are then repeated for a second contact, or group of contacts. Note, in some instances, the method operations 1404, 1406 and 1408 are executed for a group of contacts that share in common the same video script. For example, when multiple contacts share the same first name, the video script presented to an agent end-user for those multiple contacts may be the same. In such an instance, a single, personalized video clip recorded by the agent end-user may be communicated to the text messaging service for subsequent communication to multiple contacts who, for example, may share the same name, and so forth.

Turning now to FIG. 15, when the text messaging service receives a content item (e.g., a personalized video clip) from an agent end-user, the text messaging service may process the video clip, and other data, to ensure that the video clip and the agent end-user who recorded the clip, satisfy one or more quality assurance requirements. Those skilled in the art will appreciate that the various processes and routines described in connection with FIG. 15 may, in alternative embodiments, be used in various combinations and in an order that differs from what is shown.

At method operation 1502 a personalized video clip that was previously recorded by an agent end-user is received at the text messaging service. At method operation 1504, a quality assurance check is done to determine whether the agent end-user who recorded the video clip is a trusted agent end-user. For example, consistent with some embodiments, each agent end-user may have an associated trust score. Therefore, in some instances, a check is done to determine whether the agent end-user's trust score exceeds some threshold set by the admin end-user. In other instances, an agent end-user's trust score may be automatically set when the end-user is designated as an agent for the text messaging campaign, by virtue of some relationship to the admin end-user. By way of example, if the admin end-user and the agent end-user each have an email address with the same domain name, the trust score for the agent end-user may be set automatically to indicate that the agent end-user is a trusted agent end-user.

If, at method operation 1504, the text messaging service determines that the agent end-user from whom video clip was received is not a trusted agent end-user, then the video clip may be directed to a review queue 1510, where it will be held/stored until such time as an admin end-user has reviewed (e.g., played back) and approved the video clip for sending to the intended contact or message recipient. Alternatively, if the text messaging service determines that the agent end-user from whom the video clip was received is a trusted agent end-user, then the video clip may be subjected to one or more automated quality assurance checks.

At method operation 1506, the video clip may be provided as input to any one of a plurality of software-based, automated tools, for determining that the video clip satisfies one or more quality assurance requirements. By way of example, with some embodiments, the video clip may be processed using a pre-trained machine learned model that outputs a score indicating a probability that images within the video clip include objectionable content (e.g., nudity, obscene hand gestures, etc.) With some embodiments, the video clip may be analyzed to detect the presentation of text within one or more frames of the video clip. When text is recognized, an optical character recognition (OCR) detection process may be performed to recognize words from the text. These words can then be compared to a list of objectionable words.

With some embodiments, the audio portion of the video clip may be subjected to an audio-to-text translation tool. The text resulting from the tool is then compared with the text of the video script to determine whether there is a significant difference between what the agent end-user was prompted to speak, and what text was detected by the automated tool. Similarly, the text output by the audio to text translation tool may be compared with a list of objectionable words.

At method operation 1508, output from the one or more automated content analyses and testing procedures may be compared against one or more relevant requirements. If, for example, a probability score representing a likelihood that an image within the video is objectionable exceeds some threshold, then the relevant video clip may be directed to the review queue for review and approval by the admin end-user. Similarly, if one or more words spoken by the agent end-user, or detected as a result of an OCR process, is determined to be in a list of objectionable words, the relevant video clip may be directed to the review queue 1510.

If the quality assurance check determines that the video clip satisfies all requirements, the video clip may be further processed before being sent to an intended message recipient or contact. For instance, at method operation 1512, the text messaging service may determine that the video clip is to be sent as a personalized video clip, in which case the video clip is transcoded 1514 to ensure the resulting video clip satisfies any particular message protocol requirements associated with the communication channel over which the video clip will be communicated to the device of the contact. Finally, after transcoding the video clip, the video clip may be directed to a send queue 1516, where it is finally processed and communicated with an associated text message to a device of the intended message recipient.

If the video clip is intended as a personalized intro video clip for an existing video-based story, then the text messaging service will prepend the approved video clip to the existing story 1518, ensure that the text message includes a link to the story 1520, and add the associated text message to the send queue 1522, from which it will be communicated to the intended contact.

Figure 16:
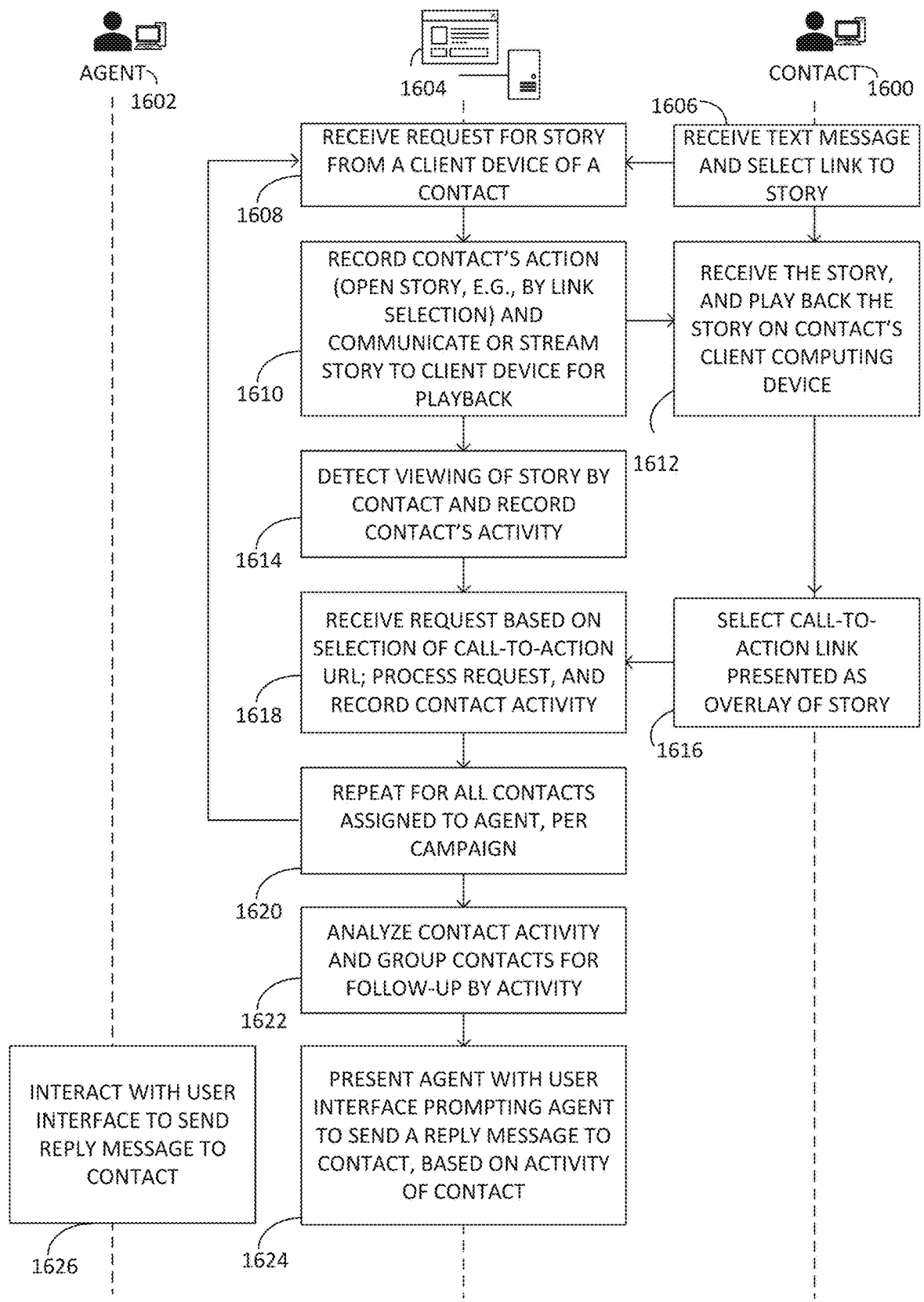
FIG. 16 illustrates a flow diagram showing various processing steps associated with a text messaging campaign that involves the sending of a personalized video-based story, consistent with embodiments of the invention.

FIG. 16 is a flow diagram illustrating various steps of a method or process facilitated by the text messaging service and associated with different actors in the conducting of a text messaging campaign, consistent with embodiments of the invention. At step 1606, a contact 1600 receives a text message from the text messaging service 1604, as sent by an agent end-user 1602. The text message includes a link to a video-based story, and the contact selects the link, causing the client computing device of the contact to send a request to the text messaging service for the story. Upon receiving the request 1608 from the client computing device of the client, the text messaging service 1604 records or logs the request 1620, as received from the contact 1600. Accordingly, the action of the contact in selecting the link associated with the story can be used subsequently as targeting criteria, for a different task or workflow of the current text messaging campaign, and/or for a subsequent or future text messaging campaign. In addition to logging the request invoked by the contact 1600, the text messaging service communicates (e.g., streams) the story to the client computing device of the contact 1610, where the story will automatically be played back via the default video player of the contact's client computing device 1612.

At step 1614, the text messaging service 1604 monitors the playback of the story at the client computing device, and if the entire video is played back or some substantial portion, the text messaging service 1604 logs an indication that the contact 1600 played and viewed the story. When the story is being played back on the client computing device of the contact 1604, a button or link, associated with a uniform resource locator (URL) as previously specified by the admin agent as part of the call-to-action, will be presented overlayed on the video that is being presented. When the contact selects the call-to-action button or link 1616, a request is communicated to the text messaging service. Again, this request is logged by the text messaging service 1618, and the action by the contact can later be used as targeting criteria— for example, to select all contacts associated with a particular workflow of a particular text messaging campaign who selected the link. In addition, the request received at the text messaging is processed, for example, by serving to the client computing device the requested resource, or redirecting the request to a service that can provide the resource.

As indicated by step 1620, this process (e.g., steps 1606 through 1618) are repeated for each contact assigned to a particular agent end-user. At step 1622, the text messaging service 1604 may analyze the log of activities for all contacts, or some group of contacts, associated with a text messaging campaign. For instance, an agent end-user may desire to send a follow-up message to all contacts who selected the link to the story, for example, as may have been presented in the initial text message of the text messaging. Accordingly, at step 1622, the text messaging service enables an agent end-user to select a group of contacts, based on previous interactions that the contact may have had with a story associated with a text message. At step 1624, the text messaging service 1604 may present the agent end-user with a user interface allowing the agent end-user to send a reply or follow-up message to one or more contacts, based on a contacts previous interaction with a story. At step 1626, the agent end-user may interact with the user interface to send a reply or follow-up text message to one or more contacts.

Figure 17:
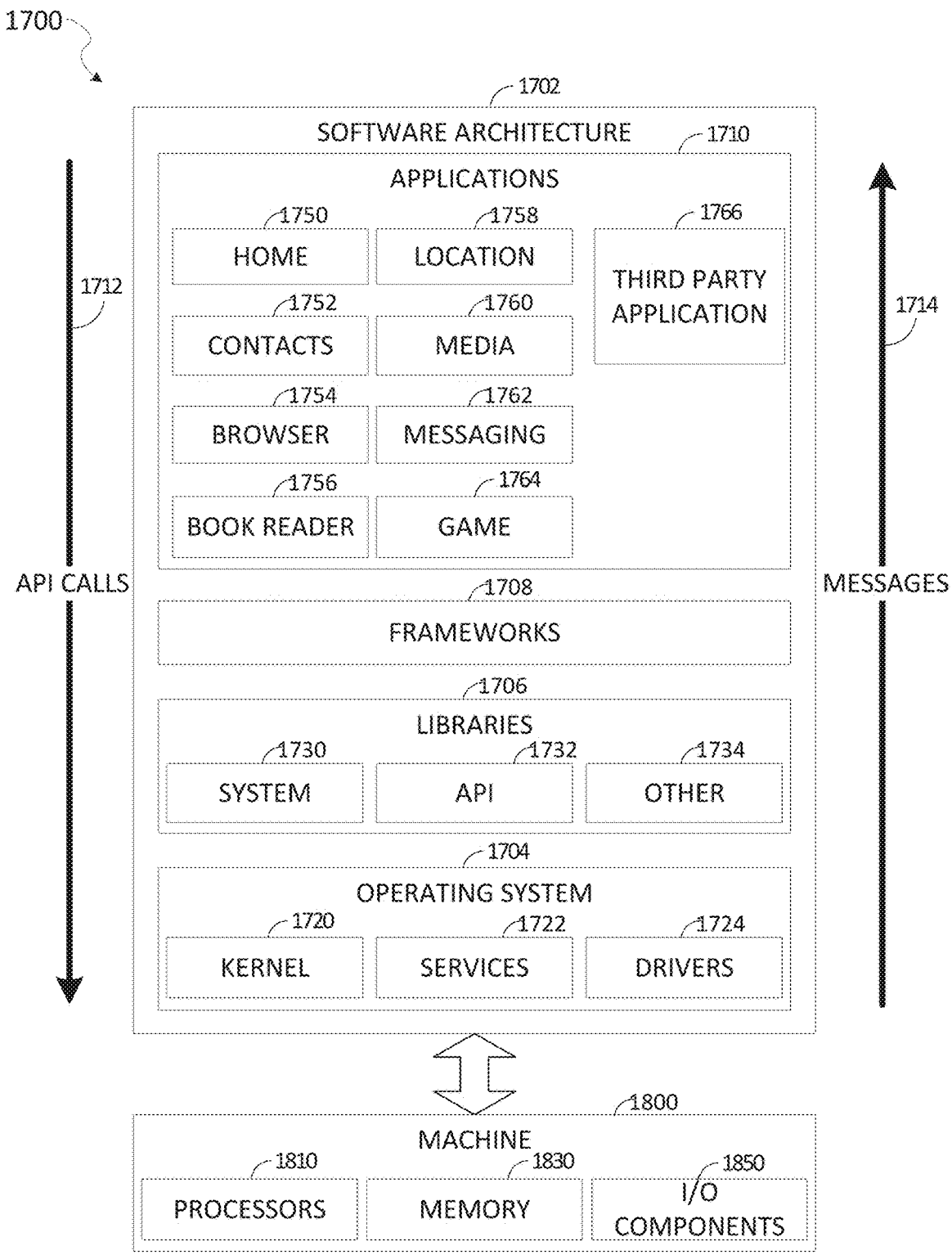
FIG. 17 illustrates a block diagram showing a software architecture, which can be installed on any of a variety of computing devices to perform methods and procedures consistent with those described herein.

FIG. 17 is a block diagram 1700 illustrating a software architecture 1702, which can be installed on any of a variety of computing devices to perform methods consistent with those described herein. FIG. 17 is merely a non-limiting example of a software architecture, and it will be appreciated that many other architectures can be implemented to facilitate the functionality described herein. In various embodiments, the software architecture 1702 is implemented by hardware such as a machine 1800 of FIG. 18 that includes processors 1810, memory 1830, and input/output (I/O) components 1850. In this example architecture, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke API calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various GUI functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications, such as a third-party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third-party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 1712 provided by the operating system 1704 to facilitate functionality described herein.

Figure 18:
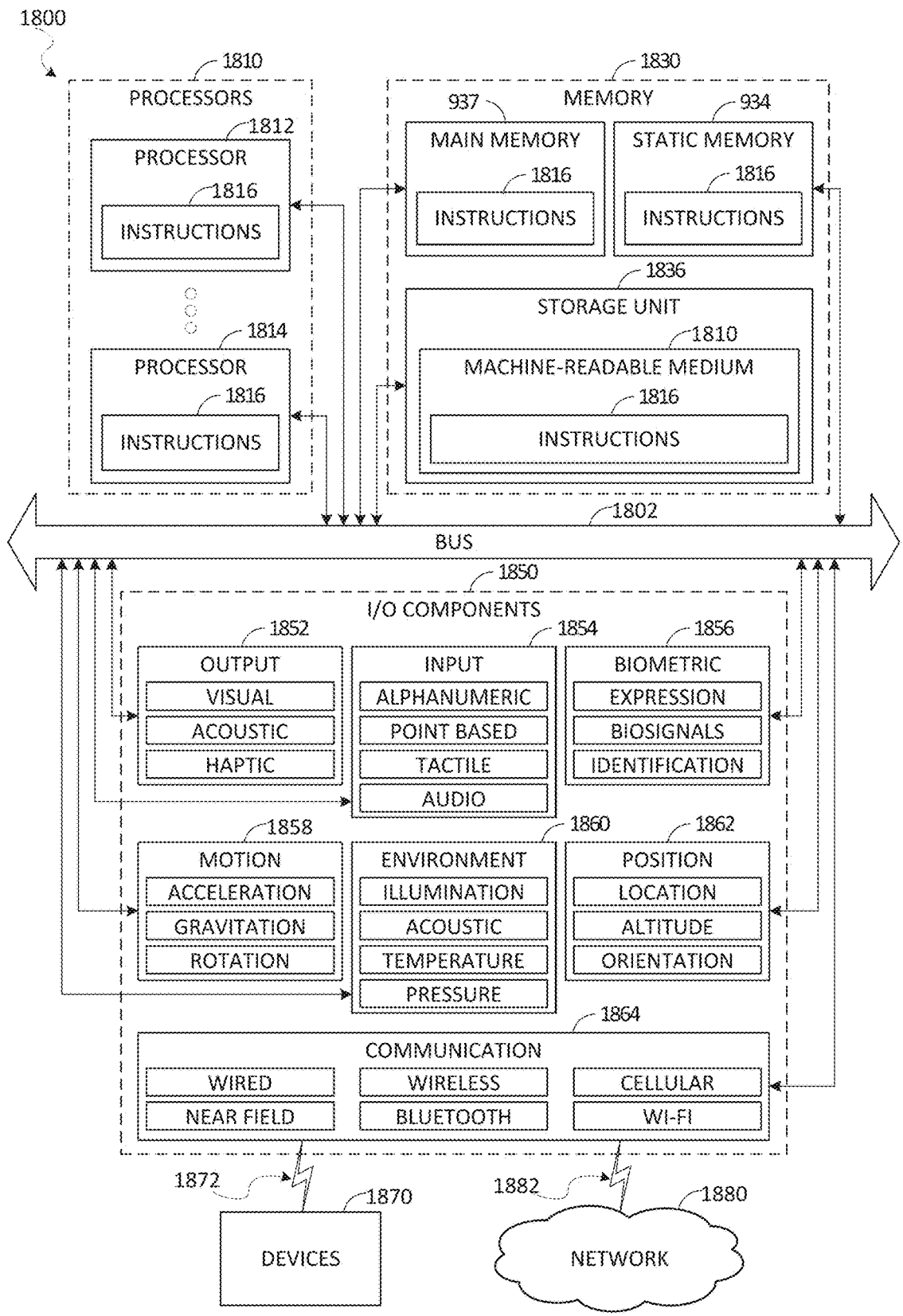
FIG. 18 illustrates a diagrammatic representation of a machine in the form of a computer system within which a set of instructions may be executed for causing the machine to perform any one or more of the methodologies discussed herein, according to an example embodiment.

FIG. 18 illustrates a diagrammatic representation of a machine 1800 in the form of a computer system within which a set of instructions may be executed for causing the machine to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example the instructions 1816 may cause the machine 1800 to execute any one of the methods or algorithms described herein. Additionally, or alternatively, the instructions 1816 may implement a system or model as described herein, and so forth. The instructions 1816 transform the general, non-programmed machine 1800 into a particular machine 1800 programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1830, and I/O components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1812 and a processor 1814 that may execute the instructions 1816. The term "processor" is intended to include multi-core processors that may comprise two or more independent processors (sometimes referred to as "cores") that may execute instructions contemporaneously. Although FIG. 18 shows multiple processors 1810, the machine 1800 may include a single processor with a single core, a single processor with multiple cores (e.g., a multi-core processor), multiple processors with a single core, multiple processors with multiples cores, or any combination thereof.

The memory 1830 may include a main memory 1832, a static memory 1834, and a storage unit 1836, all accessible to the processors 1810 such as via the bus 1802. The main memory 1830, the static memory 1834, and storage unit 1836 store the instructions 1816 embodying any one or more of the methodologies or functions described herein. The instructions 1816 may also reside, completely or partially, within the main memory 1832, within the static memory 1834, within the storage unit 1836, within at least one of the processors 1810 (e.g., within the processor's cache memory), or any suitable combination thereof, during execution thereof by the machine 1800.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862, among a wide array of other components. For example, the biometric components 1856 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1862 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or another suitable device to interface with the network 1880. In further examples, the communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a USB).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.

The various memories (i.e., 1830, 1832, 1834, and/or memory of the processor(s) 1810) and/or storage unit 1836 may store one or more sets of instructions and data structures (e.g., software) embodying or utilized by any one or more of the methodologies or functions described herein. These instructions (e.g., the instructions 1816), when executed by processor(s) 1810, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., HTTP). Similarly, the instructions 1816 may be transmitted or received using a transmission medium via the coupling 1872 (e.g., a peer-to-peer coupling) to the devices 1870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1816 for execution by the machine 1800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A computer-implemented method comprising:
   via a first user interface of a text messaging service, receiving from a first end-user of the text messaging service information for configuring a text messaging campaign, the information indicating i) a video-based story is to be associated with a first templated text message script of a workflow of a text messaging campaign, ii) the video-based story is to be personalized by prepending to the video-based story a video clip recorded by a second end-user of the text messaging service, and iii) a templated video script from which a video script is to be derived, the video script to be presented to the second end-user while the second end-user is recording a video clip to be prepended to the video-based story before the video-based story is communicated to a text message recipient;
   subsequent to receiving the information for configuring the text messaging campaign:
     updating the first templated text message script associated with the workflow of the text messaging campaign to include a link to the story;
     deriving from the updated first templated text message script a first text message addressed to at least one contact assigned to the text messaging campaign;
     deriving a video script from the templated video script; and
     presenting a second user interface to the second end-user of the text messaging service, the second user interface displaying, i) the first text message addressed to the at least one contact and with a link to the story, ii) a video script, and iii) a control interface to activate a video recording device via which the second end-user can record a personalized video clip for the at least one contact;
   wherein, prior to presenting the second user interface to the second end-user, the first end-user designated the second end-user as a participant in the text messaging campaign with authority to send text messages derived from the first templated message to a plurality of contacts.

2. The computer-implemented method of claim 1, wherein deriving a video script from the templated video script comprises processing the templated video script to resolve a reference to a variable by replacing the referenced variable with a value of the variable.

3. The computer-implemented method of claim 2, wherein the reference to the variable is a reference to a first name of a contact to whom the text message has been addressed.

4. The computer-implemented method of claim 2, wherein the reference to the variable is a reference to a name of the second end-user, who will be identified as the sender of the text message when the text message is communicated to the at least one contact.

5. The computer-implemented method of claim 1, further comprising:
   receiving from the first end-user of the text messaging service additional information for configuring the text messaging campaign, the additional information indicating that a video clip recorded by the second end-user of the text messaging service is to be reviewed and approved by another end-user, prior to the text message including the link to the story that includes the video clip being communicated to the at least one contact;
   receiving the video clip at the text messaging service; and
   storing the video clip in a review queue.

6. The computer-implemented method of claim 5, further comprising:
   presenting to the first end-user via user interface a preview of the video clip stored in the review queue;
   receiving from the first end-user via the user interface an indication that the video clip has been approved; and
   sending the first text message to the at least one contact with a link to the story that includes the video clip.

7. The computer-implemented method of claim 1, where in the second user interface prompts the second end-user to record a video clip for a plurality of contacts, wherein the video script conveys a message personalized for each contact in the plurality of contacts.

8. A computer-implemented method comprising:
   via a first user interface of a text messaging service, receiving from a first end-user of the text messaging service information for configuring a text messaging campaign, the information indicating i) a personalized video clip is to be associated with a first templated text message script of a workflow of a text messaging campaign, and ii) a templated video script from which a video script is to be derived, the video script to be presented to a second end-user while the second end-user is recording the personalized video clip;
   subsequent to receiving the information for configuring the text messaging campaign:
     deriving from the first templated text message script a first text message addressed to a contact assigned to the text messaging campaign;
     deriving a video script from the templated video script; and presenting a second user interface to the second end-user of the text messaging service, the second user interface displaying, i) the first text message addressed to the contact ii) a video script, and iii) a control interface to activate a video recording device via which the second end-user can record a personalized video clip for the contact;

wherein, prior to presenting the second user interface to the second end-user, the first end-user designated the second end-user as a participant in the text messaging campaign with authority to send text messages derived from the first templated message to a plurality of contacts.

9. The computer-implemented method of claim 8, wherein deriving a video script from the templated video script comprises processing the templated video script to resolve a reference to a variable by replacing the referenced variable with a value of the variable.

10. The computer-implemented method of claim 9, wherein the reference to the variable is a reference to a first name of a contact to whom the text message has been addressed.

11. The computer-implemented method of claim 9, wherein the reference to the variable is a reference to a name of the second end-user, who will be identified as the sender of the text message when the text message is communicated to the contact.

12. The computer-implemented method of claim 8, further comprising:
receiving from the first end-user of the text messaging service additional information for configuring the text messaging campaign, the additional information indicating that a video clip recorded by the second end-user of the text messaging service is to be reviewed and approved by another end-user, prior to the text message being communicated to the at least one contact;
receiving the video clip at the text messaging service; and
storing the video clip in a review queue.

13. The computer-implemented method of claim 5, further comprising:
presenting to the first end-user via user interface a preview of the video clip stored in the review queue;
receiving from the first end-user via the user interface an indication that the video clip has been approved; and
sending the first text message to the at least one contact with a link to the story that includes the video clip.

14. A system comprising:
a memory storage device storing thereon computer-readable instructions;
at least one processor, which, when executing the computer-readable instructions, causes the system to:
via a first user interface of a text messaging service, receive from a first end-user of the text messaging service information for configuring a text messaging campaign, the information indicating i) a video-based story is to be associated with a first templated text message script of a workflow of a text messaging campaign, ii) the video-based story is to be personalized by prepending to the video-based story a video clip recorded by a second end-user of the text messaging service, and iii) a templated video script from which a video script is to be derived, the video script to be presented to the second end-user while the second end-user is recording a video clip to be prepended to the video-based story before the video-based story is communicated to a text message recipient;

subsequent to receiving the information for configuring the text messaging campaign:
update the first templated text message script associated with the workflow of the text messaging campaign to include a link to the story;
derive from the updated first templated text message script a first text message addressed to at least one contact assigned to the text messaging campaign;
derive a video script from the templated video script; and
present a second user interface to the second end-user of the text messaging service, the second user interface displaying, i) the first text message addressed to the at least one contact and with a link to the story, ii) a video script, and iii) a control interface to activate a video recording device via which the second end-user can record a personalized video clip for the at least one contact;

wherein, prior to presenting the second user interface to the second end-user, the first end-user designated the second end-user as a participant in the text messaging campaign with authority to send text messages derived from the first templated message to a plurality of contacts.

15. The system of claim 14, wherein the memory storage device is storing thereon additional computer-readable instruction, which, when executed by the at least one processor, cause the system to:
Process the templated video script to resolve a reference to a variable by replacing the referenced variable with a value of the variable.

16. The system of claim 15, wherein the reference to the variable is a reference to a first name of a contact to whom the text message has been addressed.

17. The system of claim 15, wherein the reference to the variable is a reference to a name of the second end-user, who will be identified as the sender of the text message when the text message is communicated to the at least one contact.

18. The system of claim 14, wherein the memory storage device is storing thereon additional computer-readable instruction, which, when executed by the at least one processor, cause the system to:
receive from the first end-user of the text messaging service additional information for configuring the text messaging campaign, the additional information indicating that a video clip recorded by the second end-user of the text messaging service is to be reviewed and approved by another end-user, prior to the text message including the link to the story that includes the video clip being communicated to the at least one contact;
receive the video clip at the text messaging service; and
store the video clip in a review queue.

19. The system of claim 18, wherein the memory storage device is storing thereon additional computer-readable instruction, which, when executed by the at least one processor, cause the system to:
present to the first end-user via user interface a preview of the video clip stored in the review queue;
receive from the first end-user via the user interface an indication that the video clip has been approved; and
send the first text message to the at least one contact with a link to the story that includes the video clip.

20. The system of claim 15, wherein the second user interface prompts the second end-user to record a video clip for a plurality of contacts, wherein the video script conveys a message personalized for each contact in the plurality of contacts.

21. A system comprising:
a memory storage device storing thereon computer-readable instructions;
at least one processor, which, when executing the computer-readable instructions, causes the system to:
via a first user interface of a text messaging service, receive from a first end-user of the text messaging service information for configuring a text messaging campaign, the information indicating i) a personalized video clip is to be associated with a first templated text message script of a workflow of a text messaging campaign, and ii) a templated video script from which a video script is to be derived, the video script to be presented to a second end-user while the second end-user is recording the personalized video clip;
subsequent to receiving the information for configuring the text messaging campaign:
derive from the first templated text message script a first text message addressed to a contact assigned to the text messaging campaign;
derive a video script from the templated video script; and
present a second user interface to the second end-user of the text messaging service, the second user interface displaying, i) the first text message addressed to the contact ii) a video script, and iii) a control interface to activate a video recording device via which the second end-user can record a personalized video clip for the contact;
wherein, prior to presenting the second user interface to the second end-user, the first end-user designated the second end-user as a participant in the text messaging campaign with authority to send text messages derived from the first templated message to a plurality of contacts.

22. The system of claim 21, wherein the memory storage device is storing thereon additional computer-readable instruction, which, when executed by the at least one processor, cause the system to:
process the templated video script to resolve a reference to a variable by replacing the referenced variable with a value of the variable.

23. The system of claim 22, wherein the reference to the variable is a reference to a first name of a contact to whom the text message has been addressed.

24. The system of claim 22, wherein the reference to the variable is a reference to a name of the second end-user, who will be identified as the sender of the text message when the text message is communicated to the contact.

25. The system of claim 21, wherein the memory storage device is storing thereon additional computer-readable instruction, which, when executed by the at least one processor, cause the system to:
receive from the first end-user of the text messaging service additional information for configuring the text messaging campaign, the additional information indicating that a video clip recorded by the second end-user of the text messaging service is to be reviewed and approved by another end-user, prior to the text message being communicated to the at least one contact;
receive the video clip at the text messaging service; and
store the video clip in a review queue.

26. The system of claim 25, wherein the memory storage device is storing thereon additional computer-readable instruction, which, when executed by the at least one processor, cause the system to:
present to the first end-user via user interface a preview of the video clip stored in the review queue;
receive from the first end-user via the user interface an indication that the video clip has been approved; and
send the first text message to the at least one contact with a link to the story that includes the video clip.

* * * * *